US00RE43037E

(19) United States
(12) Reissued Patent
Walker et al.

(10) Patent Number: US RE43,037 E
(45) Date of Reissued Patent: Dec. 20, 2011

(54) GAMING DEVICE FOR OPERATING IN A REVERSE PAYOUT MODE AND A METHOD OF OPERATING SAME

(75) Inventors: Jay S. Walker, Ridgefield, CT (US); James A. Jorasch, New York, NY (US); Thomas M. Sparico, New York, NY (US)

(73) Assignee: IGT, Reno, NV (US)

( * ) Notice: This patent is subject to a terminal disclaimer.

(21) Appl. No.: 11/542,040

(22) Filed: Oct. 2, 2006
(Under 37 CFR 1.47)

Related U.S. Patent Documents

Reissue of:
(64) Patent No.: 6,113,492
Issued: Sep. 5, 2000
Appl. No.: 08/885,345
Filed: Jun. 30, 1997

U.S. Applications:
(63) Continuation of application No. 10/222,523, filed on Aug. 16, 2002, now Pat. No. Re. 39,817.

(51) Int. Cl.
*G06F 17/00* (2006.01)

(52) U.S. Cl. ..... 463/25; 463/26; 463/27; 463/42; 463/20; 273/237; 273/143 R

(58) Field of Classification Search ..... None
See application file for complete search history.

(56) References Cited

U.S. PATENT DOCUMENTS

| | | | | |
|---|---|---|---|---|
| 3,810,627 | A * | 5/1974 | Levy | 463/26 |
| 4,339,798 | A | 7/1982 | Hedges | |
| 4,669,731 | A | 6/1987 | Clarke | |
| 4,856,787 | A * | 8/1989 | Itkis | 273/237 |
| 4,991,848 | A | 2/1991 | Greenwood et al. | |
| 5,178,390 | A * | 1/1993 | Okada | 273/143 R |

(Continued)

FOREIGN PATENT DOCUMENTS

WO WO96/00950 * 1/1996

OTHER PUBLICATIONS

International Gaming & Wagering Business (IGWB), vol. 17, No. 4, pp. 2 and 36, Apr. 1996.

*Primary Examiner* — Paula A. D'Agostino
(74) *Attorney, Agent, or Firm* — K&L Gates LLP

(57) ABSTRACT

A gaming device of the type wherein a play generates one of multiple possible outcomes having reverse payout information. The gaming device comprises a memory device containing a first set of data correlating possible outcomes to a first set of payouts and a second set of data correlating possible outcomes to a second set of payouts second set of data correlates a majority of outcomes to positive payouts and the first set of data correlates a majority of outcomes to other than positive payouts. The gaming device also includes a payout selector indicating which of the first set of data and the second set of data the gaming device is to access. In an alternate embodiment, the gaming device includes a memory having only the second set of data.

41 Claims, 23 Drawing Sheets

1300

| PAY COMBINATION 1310 | NUMBER OF COINS AWARDED 1320 | EXPECTED HITS 1330 | PLAYER WIN / LOSS 1340 | EXPECTED HITS (X) WIN / LOSS 1350 |
|---|---|---|---|---|
| CHERRY / ANY / ANY | 0 | 680 | -1 | -680 |
| ANY / ANY / CHERRY | 0 | 680 | -1 | -680 |
| CHERRY / CHERRY / ANY | 0 | 200 | -4 | -800 |
| ANY / CHERRY / CHERRY | 0 | 200 | -4 | -800 |
| CHERRY / ANY / CHERRY | 0 | 68 | -4 | -272 |
| CHERRY / CHERRY / CHERRY | 0 | 20 | -19 | -380 |
| BAR / ORANGE / ORANGE | 0 | 42 | -9 | -378 |
| ORANGE / ORANGE / BAR | 0 | 6 | -9 | -54 |
| ORANGE /ORANGE / ORANGE | 0 | 42 | -19 | -798 |
| BAR / PLUM / PLUM | 0 | 20 | -13 | -260 |
| PLUM / PLUM / BAR | 0 | 5 | -13 | -65 |
| PLUM / PLUM / PLUM | 0 | 50 | -19 | -950 |
| BAR / BELL / BELL | 0 | 4 | -17 | -68 |
| BELL / BELL / BAR | 0 | 20 | -17 | -340 |
| BELL / BELL / BELL | 0 | 20 | -19 | -380 |
| BAR / BAR / BAR | 0 | 20 | -49 | -980 |
| 7 / 7 / 7 | 99 | 1 | 99 | 99 |
| OTHER | 1 | 8,570 | 1 | 8,570 |

U.S. PATENT DOCUMENTS 5,429,361 A * 7/1995 Raven et al. ..... 463/25
5,570,885 A * 11/1996 Ornstein ..... 463/27
5,655,961 A * 8/1997 Acres et al. ..... 463/27
5,669,606 A 9/1997 Brown ..... 273/292
5,770,533 A * 6/1998 Franchi ..... 463/42
6,110,041 A * 8/2000 Walker et al. ..... 463/20
6,293,866 B1 * 9/2001 Walker et al. ..... 463/42

* cited by examiner

128A

| RANDOM NUMBER 230 | REEL 1 232 | REEL 2 234 | REEL 3 236 | PAY COMBINATION 238 | NUMBER OF COINS AWARDED 240 | PLAYER WIN / LOSS 242 |
|---|---|---|---|---|---|---|
| 00001 | 7 | 7 | 7 | 7 / 7 / 7 | 100 | -99 |
| 00002 | 7 | 7 | BAR | OTHER | 0 | -1 |
| 00003 | 7 | 7 | CHERRY | ANY / ANY / CHERRY | 2 | 1 |
| 00004 | 7 | 7 | ORANGE | OTHER | 0 | -1 |
| 00005 | 7 | BAR | BAR | OTHER | 0 | -1 |
| 00006 | 7 | BAR | CHERRY | ANY / ANY / CHERRY | 2 | 1 |
| ⋮ | ⋮ | ⋮ | ⋮ | ⋮ | ⋮ | ⋮ |
| 00112 | BAR | BAR | BAR | BAR / BAR / BAR | 50 | 49 |
| 00113 | BAR | BELL | BELL | OTHER | 0 | -1 |
| 00114 | BAR | BELL | CHERRY | ANY / ANY / CHERRY | 2 | 1 |
| 00115 | BAR | BELL | ORANGE | OTHER | 0 | -1 |
| 00116 | BAR | BELL | PLUM | OTHER | 0 | -1 |
| 00117 | BAR | PLUM | PLUM | BAR / PLUM / PLUM | 14 | 13 |
| ⋮ | ⋮ | ⋮ | ⋮ | ⋮ | ⋮ | ⋮ |
| 03456 | BELL | BELL | BELL | BELL / BELL / BELL | 20 | 19 |
| 03457 | BELL | BELL | CHERRY | ANY / ANY / CHERRY | 2 | 1 |
| 03458 | BELL | BELL | ORANGE | OTHER | 0 | -1 |
| 03459 | BELL | BELL | PLUM | OTHER | 0 | -1 |
| ⋮ | ⋮ | ⋮ | ⋮ | ⋮ | ⋮ | ⋮ |
| 10647 | ORANGE | ORANGE | ORANGE | ORANGE / ORANGE / ORANGE | 20 | 19 |
| 10648 | ORANGE | ORANGE | BAR | ORANGE / ORANGE / BAR | 10 | 9 |

FIG. 2A

PRIOR ART

SYMBOL / REEL ALLOCATION DATABASE

| SYMBOL | REELS 332 | | |
|---|---|---|---|
| | REEL 1 132 | REEL 2 134 | REEL 3 136 |
| CHERRY | 2 | 5 | 2 |
| ORANGE | 2 | 3 | 7 |
| PLUM | 5 | 1 | 10 |
| BELL | 10 | 2 | 1 |
| BAR | 2 | 10 | 1 |
| 7 | 1 | 1 | 1 |

FIG. 2B

PRIOR ART

128C

| PAY COMBINATION 220 | NUMBER OF COINS AWARDED 222 | EXPECTED HITS 224 | PLAYER WIN / LOSS 226 | EXPECTED HITS (X) WIN / LOSS 228 |
|---|---|---|---|---|
| CHERRY / ANY / ANY | 1 | 680 | 1 | 680 |
| ANY / ANY / CHERRY | 1 | 680 | 1 | 680 |
| CHERRY / CHERRY / ANY | 4 | 200 | 4 | 800 |
| ANY / CHERRY / CHERRY | 4 | 200 | 4 | 800 |
| CHERRY / ANY / CHERRY | 4 | 68 | 4 | 272 |
| CHERRY / CHERRY / CHERRY | 19 | 20 | 19 | 380 |
| BAR / ORANGE / ORANGE | 19 | 42 | 9 | 378 |
| ORANGE / ORANGE / BAR | 9 | 6 | 9 | 54 |
| ORANGE /ORANGE / ORANGE | 19 | 42 | 19 | 798 |
| BAR / PLUM / PLUM | 13 | 20 | 13 | 260 |
| PLUM / PLUM / BAR | 13 | 5 | 13 | 65 |
| PLUM / PLUM / PLUM | 19 | 50 | 19 | 950 |
| BAR / BELL / BELL | 17 | 4 | 17 | 68 |
| BELL / BELL / BAR | 17 | 20 | 17 | 340 |
| BELL / BELL / BELL | 19 | 20 | 19 | 380 |
| BAR / BAR / BAR | 49 | 20 | 49 | 980 |
| 7 / 7 / 7 | 99 | 1 | 99 | 99 |
| OTHER | -1 | 8,570 | -1 | -8,570 |

FIG. 2C

PRIOR ART

146A

| PAY COMBINATION 310 | NUMBER OF COINS AWARDED 312 | EXPECTED HITS 314 | PLAYER WIN / LOSS 316 | EXPECTED HITS (X) WIN / LOSS 318 |
|---|---|---|---|---|
| CHERRY / ANY / ANY | 0 | 680 | -1 | -680 |
| ANY / ANY / CHERRY | 0 | 680 | -1 | -680 |
| CHERRY / CHERRY / ANY | 0 | 200 | -4 | -800 |
| ANY / CHERRY / CHERRY | 0 | 200 | -4 | -800 |
| CHERRY / ANY / CHERRY | 0 | 68 | -4 | -272 |
| CHERRY / CHERRY / CHERRY | 0 | 20 | -19 | -380 |
| BAR / ORANGE / ORANGE | 0 | 42 | -9 | -378 |
| ORANGE / ORANGE / BAR | 0 | 6 | -9 | -54 |
| ORANGE /ORANGE / ORANGE | 0 | 42 | -19 | -798 |
| BAR / PLUM / PLUM | 0 | 20 | -13 | -260 |
| PLUM / PLUM / BAR | 0 | 5 | -13 | -65 |
| PLUM / PLUM / PLUM | 0 | 50 | -19 | -950 |
| BAR / BELL / BELL | 0 | 4 | -17 | -68 |
| BELL / BELL / BAR | 0 | 20 | -17 | -340 |
| BELL / BELL / BELL | 0 | 20 | -19 | -380 |
| BAR / BAR / BAR | 0 | 20 | -49 | -980 |
| 7 / 7 / 7 | 0 | 1 | -99 | -99 |
| OTHER | 1 | 8,570 | -1 | 8,570 |

FIG. 3A

146B

| PAY COMBINATION 320 | NUMBER OF COINS AWARDED 322 | EXPECTED HITS 324 | PLAYER WIN / LOSS 326 | EXPECTED HITS (X) WIN / LOSS 328 |
|---|---|---|---|---|
| CHERRY / ANY / ANY | 98 | 680 | -1 | -680 |
| ANY / ANY / CHERRY | 98 | 680 | -1 | -680 |
| CHERRY / CHERRY / ANY | 95 | 200 | -4 | -800 |
| ANY / CHERRY / CHERRY | 95 | 200 | -4 | -800 |
| CHERRY / ANY / CHERRY | 95 | 68 | -4 | -272 |
| CHERRY / CHERRY / CHERRY | 80 | 20 | -19 | -380 |
| BAR / ORANGE / ORANGE | 90 | 42 | -9 | -378 |
| ORANGE / ORANGE / BAR | 90 | 6 | -9 | -54 |
| ORANGE /ORANGE / ORANGE | 80 | 42 | -19 | -798 |
| BAR / PLUM / PLUM | 86 | 20 | -13 | -260 |
| PLUM / PLUM / BAR | 86 | 5 | -13 | -65 |
| PLUM / PLUM / PLUM | 82 | 50 | -19 | -950 |
| BAR / BELL / BELL | 82 | 4 | -17 | -68 |
| BELL / BELL / BAR | 82 | 20 | -17 | -340 |
| BELL / BELL / BELL | 80 | 20 | -19 | -380 |
| BAR / BAR / BAR | 50 | 20 | -49 | -980 |
| 7 / 7 / 7 | 0 | 1 | -99 | -99 |
| OTHER | 100 | 8,570 | 1 | 8,570 |

FIG. 3B

146C

| PAY COMBINATION 330 | NUMBER OF COINS AWARDED 332 | EXPECTED HITS 334 | PLAYER WIN / LOSS 336 | EXPECTED HITS (X) WIN / LOSS 338 |
|---|---|---|---|---|
| CHERRY / ANY / ANY | 0 | 680 | -5 | -3,400 |
| ANY / ANY / CHERRY | 0 | 680 | -5 | -3,400 |
| CHERRY / CHERRY / ANY | 0 | 200 | -5 | -1,000 |
| ANY / CHERRY / CHERRY | 0 | 200 | -5 | -1,000 |
| CHERRY / ANY / CHERRY | 0 | 68 | -5 | -340 |
| CHERRY / CHERRY / CHERRY | 0 | 20 | -5 | -100 |
| BAR / ORANGE / ORANGE | 0 | 42 | -5 | -210 |
| ORANGE / ORANGE / BAR | 0 | 6 | -5 | -30 |
| ORANGE /ORANGE / ORANGE | 0 | 42 | -5 | -210 |
| BAR / PLUM / PLUM | 0 | 20 | -5 | -100 |
| PLUM / PLUM / BAR | 0 | 5 | -5 | -25 |
| PLUM / PLUM / PLUM | 0 | 50 | -5 | -250 |
| BAR / BELL / BELL | 0 | 4 | -5 | -20 |
| BELL / BELL / BAR | 0 | 20 | -5 | -100 |
| BELL / BELL / BELL | 0 | 20 | -5 | -100 |
| BAR / BAR / BAR | 0 | 20 | -5 | -100 |
| 7 / 7 / 7 | 0 | 1 | -5 | -5 |
| OTHER | 6 | 8,570 | 1 | 8,570 |

FIG. 3C

146D

| PAY COMBINATION 340 | NUMBER OF COINS AWARDED 342 | EXPECTED HITS 344 | PLAYER WIN / LOSS 346 | EXPECTED HITS (X) WIN / LOSS 348 |
|---|---|---|---|---|
| CHERRY / ANY / ANY | 0 | 680 | -5 | -3,400 |
| ANY / ANY / CHERRY | 0 | 680 | -5 | -3,400 |
| CHERRY / CHERRY / ANY | 0 | 200 | -5 | -1,000 |
| ANY / CHERRY / CHERRY | 0 | 200 | -5 | -1,000 |
| CHERRY / ANY / CHERRY | 0 | 68 | -5 | -340 |
| CHERRY / CHERRY / CHERRY | 0 | 20 | -5 | -100 |
| BAR / ORANGE / ORANGE | 0 | 42 | -5 | -210 |
| ORANGE / ORANGE / BAR | 0 | 6 | -5 | -30 |
| ORANGE /ORANGE / ORANGE | 0 | 42 | -5 | -210 |
| BAR / PLUM / PLUM | 0 | 20 | -5 | -100 |
| PLUM / PLUM / BAR | 0 | 5 | -5 | -25 |
| PLUM / PLUM / PLUM | 0 | 50 | -5 | -250 |
| BAR / BELL / BELL | 0 | 4 | -5 | -20 |
| BELL / BELL / BAR | 0 | 20 | -5 | -100 |
| BELL / BELL / BELL | 0 | 20 | -5 | -100 |
| BAR / BAR / BAR | 0 | 20 | -5 | -100 |
| 7 / 7 / 7 | 0 | 1 | -5 | -5 |
| OTHER | 1 | 8,570 | 1 | 8,570 |

FIG. 3D

744

| NAME 7440 | PLAYER ID NUMBER 7442 | ADDRESS 7443 | CREDIT CARD NUMBER 7445 | CREDIT BALANCE 7446 | COMP. INFO 7447 | PLAYER STATUS RATING 7449 |
|---|---|---|---|---|---|---|
| JOHN SMITH | 276948 | 125 MAIN ST. STAMFORD, CT | 1111-2222-3333-4444 | $100.00 | N / A | HIGH ROLLER |
| HELEN AMES | 285457 | 33 STATE ST. WATERBURY, CT | 9999-8888-7777-6666 | $25.00 | NONE | NOVICE |
| CHRIS SMITH | 354496 | 44 OCEAN DR. ATLANTIC CITY, NJ | 2222-4444-6666-8888 | $65.00 | N / A | HIGH ROLLER |

FIG. 8

749

| MACHINE ID NUMBER 7491 | PLAYER ID NUMBER 7492 | WIN / LOSS 7494 | AMOUNT WAGERED 7497 | PAYOUT MODE 7498 | PAYOUT TABLE IDENTIFIER 7499 |
|---|---|---|---|---|---|
| 423 | 276948 | +1 | 5 | REVERSE | RAM |
| 424 | 294623 | -5 | 5 | REVERSE | DSD 1-1 |
| 425 | 287654 | +5 | 5 | REVERSE | DSD 1-1 |

FIG. 9

1300

| PAY COMBINATION 1310 | NUMBER OF COINS AWARDED 1320 | EXPECTED HITS 1330 | PLAYER WIN / LOSS 1340 | EXPECTED HITS (X) WIN / LOSS 1350 |
|---|---|---|---|---|
| CHERRY / ANY / ANY | 0 | 680 | -1 | -680 |
| ANY / ANY / CHERRY | 0 | 680 | -1 | -680 |
| CHERRY / CHERRY / ANY | 0 | 200 | -4 | -800 |
| ANY / CHERRY / CHERRY | 0 | 200 | -4 | -800 |
| CHERRY / ANY / CHERRY | 0 | 68 | -4 | -272 |
| CHERRY / CHERRY / CHERRY | 0 | 20 | -19 | -380 |
| BAR / ORANGE / ORANGE | 0 | 42 | -9 | -378 |
| ORANGE / ORANGE / BAR | 0 | 6 | -9 | -54 |
| ORANGE /ORANGE / ORANGE | 0 | 42 | -19 | -798 |
| BAR / PLUM / PLUM | 0 | 20 | -13 | -260 |
| PLUM / PLUM / BAR | 0 | 5 | -13 | -65 |
| PLUM / PLUM / PLUM | 0 | 50 | -19 | -950 |
| BAR / BELL / BELL | 0 | 4 | -17 | -68 |
| BELL / BELL / BAR | 0 | 20 | -17 | -340 |
| BELL / BELL / BELL | 0 | 20 | -19 | -380 |
| BAR / BAR / BAR | 0 | 20 | -49 | -980 |
| 7 / 7 / 7 | 99 | 1 | 99 | 99 |
| OTHER | 1 | 8,570 | 1 | 8,570 |

FIG. 13A

1300B

| PAY COMBINATION 1360 | NUMBER OF COINS AWARDED 1370 | EXPECTED HITS 1380 | PLAYER WIN / LOSS 1390 | EXPECTED HITS (X) WIN / LOSS 1395 |
|---|---|---|---|---|
| CHERRY / ANY / ANY | 98 | 680 | -1 | -680 |
| ANY / ANY / CHERRY | 98 | 680 | -1 | -680 |
| CHERRY / CHERRY / ANY | 95 | 200 | -4 | -800 |
| ANY / CHERRY / CHERRY | 95 | 200 | -4 | -800 |
| CHERRY / ANY / CHERRY | 95 | 68 | -4 | -272 |
| CHERRY / CHERRY / CHERRY | 80 | 20 | -19 | -380 |
| BAR / ORANGE / ORANGE | 90 | 42 | -9 | -378 |
| ORANGE / ORANGE / BAR | 90 | 6 | -9 | -54 |
| ORANGE /ORANGE / ORANGE | 80 | 42 | -19 | -798 |
| BAR / PLUM / PLUM | 86 | 20 | -13 | -260 |
| PLUM / PLUM / BAR | 86 | 5 | -13 | -65 |
| PLUM / PLUM / PLUM | 80 | 50 | -19 | -950 |
| BAR / BELL / BELL | 82 | 4 | -17 | -68 |
| BELL / BELL / BAR | 82 | 20 | -17 | -340 |
| BELL / BELL / BELL | 80 | 20 | -19 | -380 |
| BAR / BAR / BAR | 50 | 20 | -49 | -980 |
| 7 / 7 / 7 | 198 | 1 | 99 | -99 |
| OTHER | 100 | 8,570 | 1 | 8,570 |

FIG. 13B

GAMING DEVICE FOR OPERATING IN A REVERSE PAYOUT MODE AND A METHOD OF OPERATING SAME

Matter enclosed in heavy brackets [ ] appears in the original patent but forms no part of this reissue specification; matter printed in italics indicates the additions made by reissue.

*More than one reissue application has been filed for U.S. Pat. No. 6,113,492. The present application is a continuation of Reissue application Ser. No. 10/222,523, filed Aug. 16, 2002, now U.S. Reissue Pat. No. RE39,817, which is hereby incorporated by reference in its entirety. U.S. Reissue application Ser. No. 10/222,523, filed Aug. 16, 2002, now U.S. Reissue Pat. No. RE39,817, is a Reissue of Ser. No. 08/885,345, filed on Jun. 30, 1997, now U.S. Pat. No. 6,113,492.*

*The present application is related to co-pending U.S. Reissue application Ser. Nos. 11/542,041 and 11/542,042 filed Oct. 2, 2006.*

BACKGROUND OF THE INVENTION

1. Field of the Invention

The present invention relates generally to a method and apparatus for operation of a gaming device, such as a slot machine and, more particularly, for reverse payout play of such a gaming device.

2. Description of the Related Art

Owners and operators of gaming devices are constantly searching for new and innovative ways of attracting players to the gaming devices in order to keep them gambling for prolonged periods of time. One factor in determining whether a player will continue playing a gaming device is the player's perception of the odds of winning. When a player feels lucky and perceives the odds of winning to be high, the player will likely continue playing. On the other hand, when the player feels unlucky and perceives the odds of winning to be low, the player will likely stop playing or, even more troubling to the owner or operator of the gaming devices, travel to another casino where he perceives his odds of winning to be better.

It is a general belief that the odds of winning at a gaming device depend on the past activity of the gaining device. For example, players often perceive the odds of winning to be greater on a slot machine that has not recently paid out any jackpots. In gaming vernacular, such a machine is thought to be "due to hit." Other times, such as immediately after hitting a jackpot, players perceive the odds of future winnings on a particular slot machine to be low. Consequently, after winning a jackpot, a player may stop playing, thereby causing the casino owner to lose revenue. Because the player has no way to take advantage of what he believes to be a cold machine or cold casino, many players feel as though they need to move to a different machine or a different casino.

Some casino games have avoided this problem by allowing the player to place a bet either against the house or for the house. In the game of craps, for example, the objective of the game is for the shooter to either win on the initial come-out throw or throw certain numbers twice before rolling a seven. In making a 8pass lines bet, the player is betting that he will accomplish this objective. If he does not think that he will be successful, the payer may make a ôdont passö bet in which the player is effectively able to bet with the house. A player experiencing a run of bad luck, for example, may effectively bet with the house by betting against himself or the shooter (with the house) by electing to make the ôdont passö bet.

Unfortunately, no method exists which allows betting ôwith the houseö for gaming devices. Thus, a need exists for a method of play and a gaming device which encourages a player to continue playing on a gaming device despite feeling unlucky or perceiving poor odds of winning on a given gaming device.

SUMMARY OF THE INVENTION

The problems identified above are solved and a technical advance is achieved by providing, in accordance with the present invention, a gaming device which determines payouts according to an alternate, or reverse, payout table.

In a first embodiment of the present invention, a gaming device is disclosed. The gaming device randomly generates one of many possible outcomes for each play. The gaming device includes a wager selector indicating a wager, a memory device and a payout selector. The memory device stores a normal set of data correlating possible outcomes to a normal set of payout information and a reverse set of data correlating possible outcomes to a reverse set of payout information. The reverse set of payout information describes payouts consisting of amounts which are less than or equal to twice said wager. The payout selector indicates which set of data, the normal or reverse set of data, the gaming device is to access.

In a second embodiment of the present invention, a gaming device is disclosed. Like the first embodiment, the gaming device randomly generates one of many possible outcomes for each play and includes a wager selector indicating a wager, a memory device and a payout selector. The memory device stores a normal set of data correlating possible outcomes to a normal set of payout information and a reverse set of data correlating possible outcomes to a reverse set of payout information. The reverse set of data includes two subsets: a first subset of outcomes which correspond to payout information describing positive payout amounts in both the normal and reverse sets of data and a second subset of outcomes which correspond to payout information describing payouts consisting of amounts which are less than or equal to twice the wager. The payout selector indicates which set of data, the normal or reverse set of data, the gaming device is to access.

In a third embodiment of the present invention, a gaming device is disclosed. The gaming device randomly generates one of many possible outcomes for each play and includes a wager selector indicating a wager, a memory device and a payout selector. The memory device stores a normal set of data correlating possible outcomes to a normal set of payout information and a reverse set of data correlating possible outcomes to a reverse set of payout information. The reverse set of data describes winning outcomes and losing outcomes wherein the ratio of winning outcomes to losing outcomes is greater than one.

In a fourth embodiment of the present invention, a method is disclosed for operating a gaming device. The method includes the steps of identifying a wager, storing a normal set of data correlating possible outcomes to a normal set of payout information, and storing a reverse set of data correlating possible outcomes to a reverse set of payout information. The reverse set of payout information describes payouts consisting of amounts which are less than or equal to twice the wager. The method also includes the step of identifying a data set selection indicating which set of data, the normal or reverse set of data, the gaming device is to access. The method further includes the steps of generating a random resultant outcome and determining a resultant payout based on the wager, the data set selection and the resultant outcome.

Thus, the present invention provides players of gaming devices the ability to select an alternate payout table based on their feeling about the future outcomes to be generated by a gaming device. Moreover, operators of the subject gaming devices can retain players for a longer period of time by providing gaming devices employing such alternate payout tables.

Further aspects of the present invention will become apparent during the course of the following detailed description and by reference to the attached drawings.

BRIEF DESCRIPTION OF THE DRAWINGS

FIG. 2a is one logical representation of a normal payout table;

FIG. 2b is one logical representation of a normal payout table according to one embodiment of the present invention;

FIG. 2c is one logical representation of a normal payout table according to another embodiment of the present invention;

FIG. 3a is a logical representation of a reverse payout table according to one embodiment of the present invention;

FIG. 3b is a logical representation of a reverse payout table according to one embodiment of the present invention;

FIG. 3c is a logical representation of a reverse payout table according to the preferred embodiment of the present invention;

FIG. 3d is a logical representation of a reverse payout table according to one embodiment of the present invention;

FIG. 8 is a logical representation of a casino player database of the slot network server of FIG. 6;

FIG. 9 is a logical representation of the slot machine database of the slot network server of FIG. 6;

FIG. 13a is a logical representation of a reverse payout table according to an alternate embodiment of the present invention; and FIG. 13b is a logical representation of a reverse payout table according to an alternate embodiment of the present invention.

DETAILED DESCRIPTION OF PREFERRED EMBODIMENTS

The present invention is directed generally to a gaming device such as a slot machine, and to a method and system for playing such a gaming device.

Certain preferred embodiments of the present invention will now be described in greater detail with reference to the drawings. Although the embodiments discussed herein are directed to slot machines, it is to be understood that the present invention is equally applicable to other gaming devices, such as video poker machines, video blackjack machines, video roulette machines, video keno machines, video bingo machines, and the like.

Figure 1:
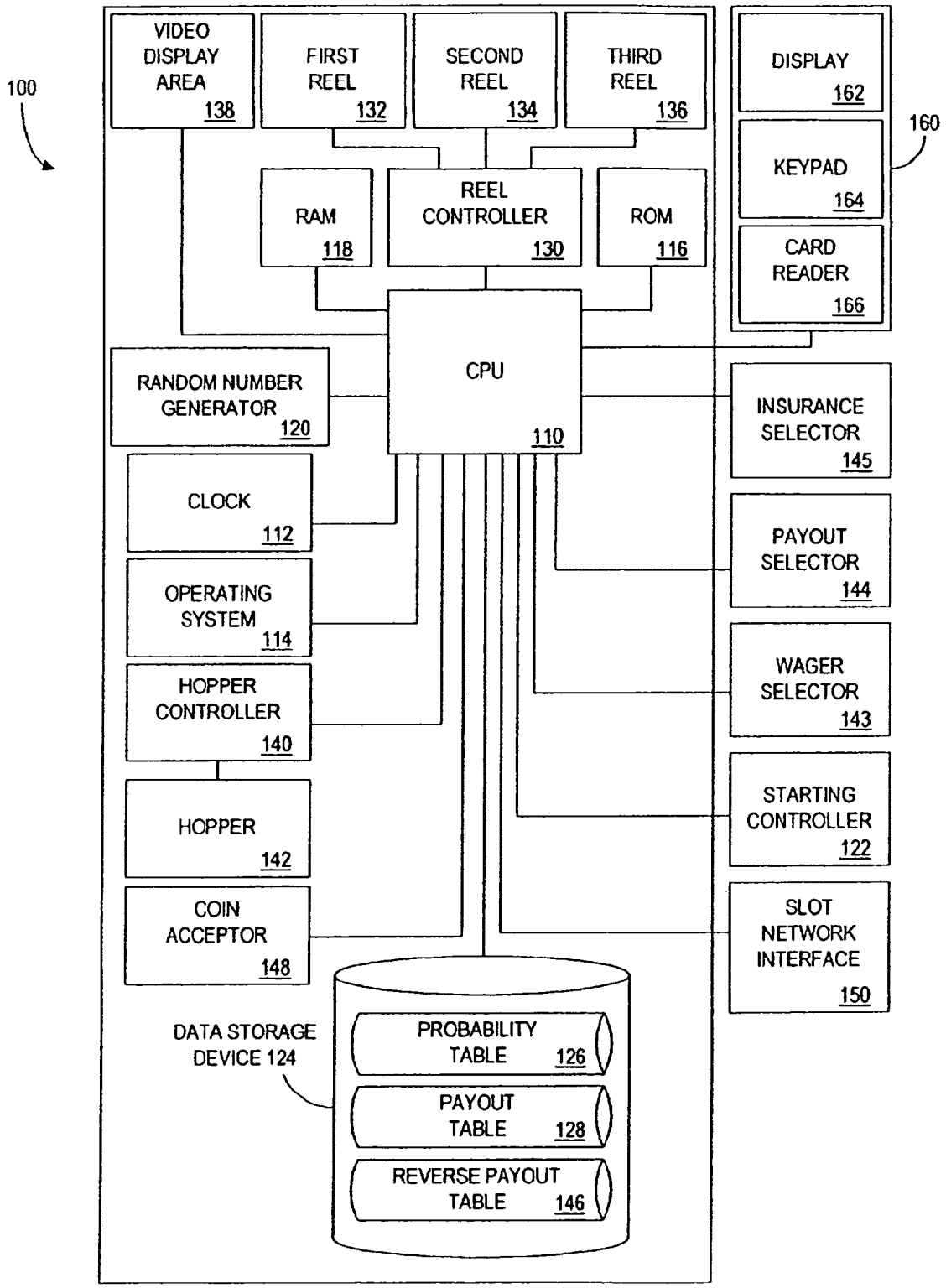
FIG. 1 is a schematic view of a slot machine according to the present invention.

With reference to FIG. 1, the slot machine 100 will now be described in greater detail. Each slot machine 100 includes a Central Processing Unit (CPU) 110, a clock 112, and an operating system 114. The CPU 110 executes instructions of a program stored in either Data Storage Device 124 or Read Only Memory (ROM) 116 for playing the slot machine 100. The Random Access Memory (RAM) 118 temporarily stores information passed to it by the CPU 110. A Random Number Generator (RNG) 120 is also in communication with the CPU 110.

The slot machine 100 operates in both a normal payout mode and a reverse payout mode. With respect to the normal payout mode of the slot machine 100, the slot machine 100 operates in a conventional manner. The player starts the machine by inserting a coin into a coin acceptor 148 connected to the CPU 110, or using electronic credit, and activating a starting controller 122. If the player has deposited more than one coin in slot machine 100 or has accumulated credits stored in slot machine 100 then he can choose the desired wager per play by pressing wager selector 143. Under control of a program stored, for example, in a data storage device 124 or the ROM 116, the CPU 110 initiates the RNG 120 to generate a random number; the CPU 110 then looks up the generated random number in a stored probability table 126 and finds the corresponding outcome. The random number may be generated through digital means, or through physical processes. Although described as random herein, the number generated may be more properly understood as pseudo-random.

In the present embodiment, each of the three reels 132, 134, 136 has twenty-two total symbols or "stops" located thereon. Therefore, given the three reels 132, 134, 136 there exists 10,648 (22×22×22=10,648) possible reel combinations or outcomes. A reel combination of ôCHERRY-BELL-PLUMö therefore represents an outcome. Alternatively, a separate random number may be generated for each reel position. These 10,648 plays are often referred to as the slot machine's "cycle." RNG 120 produces random numbers which are mapped onto these 10,648 possible outcomes, each of which has a corresponding outcome stored in probability table 126. While each of these 10,648 possible outcomes may have an equal probability of selection, the present invention may also employ non-uniform probabilities known in the art.

Based on the corresponding outcome, the CPU 110 locates the appropriate number of coins awarded in normal payout table 128. The CPU 110 also directs a reel controller 130 to spin reels 132, 134, 136 and to stop them at a point where they display an outcome which corresponds to the randomly generated number. When the player wins, the machine stores the credits in the RAM 118 and displays them in the video display area 138. The possible outcomes of slot machine 100 may be divided into subsets, with each subset representing a different ôclassö of outcome. Many slot machines, for example, are described as having three subsets or ranges of outcomes such as high-end payouts, mid-level payouts, and low-end payouts. Non-winning payouts may form a fourth subset. High-end payouts incorporate the top payouts of the machine, such as the top three jackpots. Another way to define the subset of high-end payouts is to include all payouts exceeding a fixed multiplier of the amount wagered, such as all payouts which return at least ten times the number of coins wagered. Low-end payouts typically comprise payouts of only a few coins, such as the payout for a single cherry on either the first or third reels. Those of ordinary skill in the art will appreciate that there could be any number of subsets defined for a given machine.

A hopper controller 140 is connected to a hopper 142 for dispensing coins. When the player requests to cash out by pushing a button (not shown) on the slot machine 100, the CPU 110 checks the RAM 118 to see if the player has any credit and, if so, signals the hopper controller 140 to release an appropriate number of coins into a payout tray (not shown).

Also connected to the CPU 110 is a slot network server interface 150. The slot network server interface 150 provides a communication path from the slot machine 100 to a slot network and, subsequently, to a slot network server. Thus, outcome data can be exchanged between the slot machine 100 and a slot network server. As discussed below with regard to an alternate embodiment, the slot machine 100 includes a player tracking card reader device 160. The player tracking card reader device 160, which is connected to the CPU 110, includes a display area 162, a keypad 164, and a card reader 166. As discussed below, both the keypad 164 and the card reader 166 are input devices that allow a player to communicate with the slot machine 100 and by extension, the slot network server.

In alternate embodiments, the slot machine 100 does not include the reel controller 130 and reels 132, 134 136. Instead, a video display area 138 graphically displays representations of objects contained in the selected game, such as graphical reels or playing cards. These representations are preferably animated to display the playing activity of the selected game.

It should be noted that this invention does not require a physical slot machine, and could instead be embodied completely in software. Such an embodiment would allow play as stand alone software running on conventional personal computers. Examples of slot machine software include Interbet software and www.interbet.com.

As noted above, the slot machine 100 selectively operates in a reverse payout mode. The reverse payout mode is initiated when a player selects reverse play on a payout selector 144 connected to the CPU 110. As will be appreciated by one skilled in the art, possible payout selectors 144 include a button, a toggle switch, a software flag and the like. When reverse payout mode is selected, the slot machine 100 operates generally as described above, with the exception that the CPU 110 locates the appropriate payout in a stored reverse payout table 146 rather than the normal payout table 128. The payout tables represent sets of data which correlate outcomes with payouts. As described in detail below with reference to FIGS. 2a, 2b, 2c, 3a, 3b, 3c, and 3d, a majority of the outcomes in the normal payout tables 128a-c correspond to a losing result for the player while in the reverse payout tables 146a-d, the majority of the outcomes correspond to a winning result. In other words, the ratio of winning outcomes to losing outcomes is greater than one in reverse payout tables 146a-d. Stated another way, the statistical likelihood of generating any winning outcome is greater than the statistical likelihood of generating any losing outcome. Thus, while in the short run a predominance of losing outcomes may occur, the long run expectation is that more winning outcomes will result. In some cases, the amounts won or lost as determined by the reverse payout tables 146a-d are, at least in part, inversely proportional to the amounts won or lost as determined by the normal payout tables 128a-c. In other words, for a majority of given outcomes, the greater the win as determined by the normal payout tables 128a-c, the greater the amount lost as determined by the reverse payout tables 146a-d.

The normal payout tables 128 will now be described with reference to FIGS. 2a, 2b, and 2c. FIG. 2a depicts one logical representation of the normal payout table 128a. In this representation, each of the 10,648 random numbers, as represented in the "Random Number" field 230, corresponds to a set of reel positions representing an outcome, as shown in the "Reel 1" 232, "Reel 2" 234, and "Reel 3" 236 fields. Thus, by way of example, random number "00006" corresponds to an outcome of "7-BAR-CHERRY." Further, each random number (and thus outcome) also corresponds to a pay combination, as indicated in the "Pay Combination" field 238. Each pay combination may correspond to multiple random numbers and outcomes. For example, the outcome "7-BAR-CHERRY" corresponds to the pay combination "ANY/ANY/CHERRY" as does "BAR-BELL-CHERRY." This payout table illustrates the correlation between the generated random numbers, the outcomes, (the position of each of the reels 132, 134, 136), pay combinations, and the payout information.

It is to be understood that the table of FIG. 2a contains information from both a probability table 126 and the normal payout tables 128b and 128c, and, as such, in an alternate embodiment replaces these tables.

The normal payout table 128b of the present embodiment will now be described with reference to FIG. 2b. As discussed below, the normal payout table 128b shown is a typical 94.5% payback payout table. In other words, statistically, the slot machine 100 will pay out 94.5% of the money wagered, and retain for the house 5.5% of the money wagered. In general, the normal payout table 128b correlates outcomes to payout information, including the number of coins awarded and the player win/loss amount for a given play. It is to be understood, based on the following description, that the number of coins awarded and the player win/loss amount are essentially alternate representations of the same information.

As shown, the normal payout table 128b of the present embodiment can be logically represented by five fields of related information. The data represents payout information for a one coin wagered per play model. A pay combination field 210 identifies possible pay combinations to which each outcome can be correlated. These pay combinations include, for example, "ANY/ANY/CHERRY" and "BAR/BAR/BAR", for which a positive number of coins are awarded, as indicated in the "Number of Coins Awarded" field 212. The pay combination field 210 also includes an "Other" entry for all other combinations, representing normally non-winning outcomes for which no payment is to be made to a player. These normally non-winning outcomes, such as "PLUM-BELL-ORANGE," result in no coins awarded, as indicated in the Number of Coins Awarded field 212.

Also shown in FIG. 2b, the payout table 128b includes an "Expected Hits" field 214. The expected hits field 214 indicates the number of outcomes per cycle that correspond to a given pay combination. For example, in one cycle, outcomes corresponding to the "ANY/CHERRY/CHERRY" pay combination 210 will theoretically occur two hundred times, as indicated in the expected hits field 214. Similarly, outcomes corresponding to the "CHERRY/ANY/CHERRY" pay combination in field 210 will theoretically occur sixty-eight times in every cycle. As shown, even though both of these pay combinations include two "CHERRY" symbols, the expected hits 214 differ. It is to be understood that the difference in the expected hits for "ANY/CHERRY/CHERRY" and "CHERRY/ANY/CHERRY" results from the different number of times cherry appears on each of the three reels 132, 134, 136. Specifically, in the present embodiment, the second reel 134 has more "CHERRY" stops than the first reel 132, thereby making the "ANY/CHERRY/CHERRY" pay combination more likely. This, of course, assumes that each reel stop has an equal probability of selection. It is to be understood that the present invention may also accommodate slot machines in which each reel stop has a different probability of selection.

The normal payout table 128b also includes a "Player win/loss" field 216. While the number of coins awarded field 212 equals the total payout, if any, made to a player, the Player win/loss field 216 represents the net change in the player's funds for each pay combination. A negative number indicates a loss by the player while a positive number indicates a win.

Further, the normal payout table 128b includes an "Expected Hits×Player win/loss" field 218. As implied by the name, this field represents the number of Expected hits 214 multiplied by the amount in the Player win/loss field 216 for each outcome which falls within the given pay combination. Therefore, the Expected hits×Player win/loss field 218 represents, for each pay combination, the statistically expected total amount won or lost by a player in a cycle. For example, because normally non-winning outcomes are expected 8,570 times in each cycle, and because on each play a player will lose one coin (the amount wagered) players will theoretically lose a total of 8,570 coins in every 10,648 plays for this particular pay combination in one cycle of plays on slot machine 100.

As indicated by the information in payout tables 128a-128c, the Expected hits 214 for all pay combinations totals 10,648. As further indicated by payout tables 128a-128c, the total amount won or lost for all pay combinations is negative 586, representing 586 coins lost by the player(s) and won by the house. Thus, in a one coin wagered model, in 10,648 plays, 10,648 coins are wagered, with the house retaining 586 coins. In other words, the house pays 10,062 coins back to players, or about 94.5% of the 10,648 coins wagered per each cycle, hence the 94.5% payback rate.

FIG. 2c depicts a normal payout table for a different embodiment of the present invention. In this embodiment the player is making the necessary funds available to cover the largest potential loss for one play of slot machine 100. Because the player is only making the necessary funds available, the amount stored in the Number of coins awarded field 222 is identical to the amount stored in the Player win/loss field 226 for each listed pay combination. Thus, slot machine 100 does not subtract the amount wagered before each play. Instead, the net win or loss is added to or subtracted from the players credit balance.

It is to be understood that the normal payout tables 128b and 128c depicted in FIGS. 2b and 2c include information not necessary to the operation of the present invention. Thus, in alternate embodiments, the normal payout tables 128b and 128c correlate only the pay combinations 210,220 to either the number of coins awarded 212,222 or the Player win/loss 216,226. The normal payout tables 128b and 128c need not include the Expected hits fields 214,224 or the Expected hits x Player win/loss fields 218,228. These fields include information that merely describes, not dictates, the operation of the slot machine 100.

It is also to be understood that the normal payout tables 128b and 128c may correlate the Number of coins awarded 214,224 and the Player win/loss 216,226 amounts to pay combinations for plays where other than one coin is wagered. Thus, the normal payout tables 128b and 128c are merely exemplary of possible normal payout tables. In this regard, an alternate embodiment utilizes multiple payout tables, each containing payout information for a different amount wagered. It is to be understood that in multiple coin models, there are outcomes that may provide a payout to the player but result in a loss. For example, when three coins are wagered, a payout combination may call for a payout of two coins, resulting in a loss of one coin for the player. In another embodiment, a single payout table contains the payout information for each of the different amounts wagered.

It is further to be understood that the normal payout tables 128a-c need not include a pay combinations field at all. Rather, in an alternate embodiment, the normal payout tables 128a-c directly correlate outcomes to payout information, such as the Number of coins awarded or the Player win/loss amounts.

Other normal payout tables that are within the scope of the present invention include those having different payout amounts, different reel symbols, and different pay combinations. In general, however, typical normal payout tables can be characterized in that a player wins on the occurrence of the relatively few outcomes that are the least likely to occur, and the amount of the win increases as the likelihood of the particular outcome occurring decreases.

The reverse payout tables 146a-146d of the present embodiment will now be described with reference to FIGS. 3a, 3b, 3c, and 3d and continuing reference to FIGS. 2b and 2c. The reverse payout tables 146a-d are identical in structure to the normal payout tables 128b and 128c, as described in FIGS. 2b and 2c. Inherent in this structure is the number of total possible outcomes and the corresponding pay combinations. They are different, however, in the data described in the Number of coins awarded fields 312,322,332,342 Player win/loss fields 316,326,336,346 and the Expected hits×Player win/loss fields 318,328,338,348.

In general, the reverse payout tables 146a-146d can be characterized as having payouts which occur for the relatively numerous outcomes that are the most likely to occur, while a loss occurs for the relatively few outcomes that are the least likely to occur. Thus, for the majority of outcomes, where the normal payout tables 128b and 128c provide for a zero payout or a loss, the reverse payout tables 146a-146d provide for a positive payout, or a win. Likewise, a positive payout or win in the normal payout tables 128 correspond to a loss in the reverse payout tables 146a-146d.

The reverse payout table 146a of the present embodiment is exactly the reverse of the normal payout table 128b in that each player win/loss result is reversed. Thus, because the normal payout table 128b favors the casino by about 5.5%, the reverse payout table 146a, which is exactly the opposite of the normal payout table 128c, favors the player by about 5.5%. In other words, the reverse payout table 146a is a 105.5% payback table.

Like the normal payout tables 128a-c, the reverse payout tables 146a-d include a pay combination field 310 containing the same normally winning and normally non-winning pay combinations found in the normal payout tables 128. As used herein, the term "normally winning" means winning as determined by the normal payout tables 128. Similarly, "normally non-winning" and "normally losing" means non-winning as determined by the normal payout tables 128b and 128c (i.e pay combination ôOtherö).

As with the normal payout tables 128a-128c, the Player win/loss fields 316,326,336,346 and the "Expected Hits x Player win/loss" fields 318,328,338,348 contain the theoretical amounts won or lost per play and per cycle, respectively. However, for normally winning pay combinations, the reverse payout tables 146a-146d indicate a loss to the player, and for normally losing pay combinations, the reverse payout tables 146a-146d indicate a win for the player. In other words, the player win/loss amounts 316,326,336,346 of the reverse payout tables 146a-146d may be arrived at by multiplying each Player win/loss amount 216 of the normal payout table 128b by negative one ("−1"). Because the expected hits 314, 324,334,344 are identical to those of the normal payout tables 128b and 128c, the "Expected Hits×Player win/loss" amounts 318 are the reverse of those in the normal payout tables 128b and 128c. Thus, while the normal payout table 128b results in the player losing 586 of the 10,648 coins wagered, the reverse payout table 146a results in the player winning 586 coins. Thus, the slot machine 100 of the present embodiment described in FIG. 3a becomes a 105.5% payback machine.

Because in the reverse payout table 146a depicted in FIG. 3a the Player win/loss amounts 316 include losses greater than one coin, the player must place additional funds at risk. As shown in FIG. 3a, for example, the player faces a loss of ninety-nine coins if an outcome of ô7-7-7ö is produced. As discussed below, the funds necessary to cover such losses may be stored credit that the player previously accumulated, a credit balance stored in memory, additional cash fed into the machine via a bill validator or the coin acceptor, funds stored on a stored value card or ôsmart cardö, or a credit card account.

FIG. 3b depicts an alternate embodiment of the payout table 146a described in FIG. 3a. In reverse payout 146b the slot machine 100 reduces the players credit balance by ninety-nine coins prior to generating the outcome. Specifically, the player places ninety-nine coins at risk. An outcome of ôOrange-Orange-Orangeö, for example, results in a payout of eighty coins, netting a to a loss of nineteen coins for the player.

Because the player faces large potential losses with reverse payout tables 146a and 146b, slot machine 100 could incorporate an insurance protocol in which the player deposits one coin and presses insurance selector 145 before each spin. In the event of a jackpot, the insurance policy covers the amount of the loss. Multiple insurance policies are possible, with the cost of the insurance rising with the amount of coverage increasing. The amount of coverage may be calculated with reference to the Expected hits×Player win/loss 318,328 in order to capture both the frequency and magnitude of the covered payouts.

In practice, a reverse payout table that favors players, such as reverse payout tables 146a or 146b in FIGS. 3a and 3b, is probably unacceptable to the casino operator except as a restricted promotional device. To ensure that the casino continues to make money, adjustments may be made to the reverse payout tables so that they favor the casino. In the embodiment depicted in FIGS. 3c and 3d, the reverse payout tables 146c and 146d are adjusted so that they provide for payouts which are less than the total amount of coins wagered for one cycle. The reverse payout table 146c shown in FIG. 3c includes the same fields as the reverse payout tables 146a and 146b of the prior embodiments, and the same individual pay combinations. Furthermore, in the embodiment of FIG. 3c, reverse payout mode requires a player to wager (and therefore potentially lose) at least five coins while paying out only six coins for a normally non-winning outcome/pay combination. It should be noted that the amount of coins wagered per play could be any number of coins as specified by the casino operator. Although reverse payout table 146c is described using whole coins, the present invention may be practiced using fractional coin values. Thus, for a wager of one coin, a payout may total only one sixth of a coin. These fractional amounts may be accumulated in RAM 118 and paid out when a whole coin is reached.

Focusing on the "Other," or normally losing pay combination, it is apparent that such a pay combination will theoretically hit 8,570 times in one cycle, each time causing the player to win one coin, as depicted in the Player win/loss field 336, and awarding six coins, as depicted in the number of coins awarded field 332. Six coins are awarded because the player receives the five coins that were wagered plus the one coin won.

Also shown in the Player win/loss field 336, the amount lost for each of the normally winning pay combinations is five coins. Because the player can only lose what is wagered and no more, namely five coins, there is no need to place additional funds at risk. Furthermore, given the five coin loss for each normally winning pay combination and the one coin win for each normally losing pay combination, the reverse payout table 146c theoretically results in the house winning 1,820 coins of the 53,240 coins wagered per cycle ({10,648 plays}× {5 coins/play}=53,240 coins). In other words, the reverse payout table 146c is approximately a 96.5% payback table.

The reverse payout table 146d shown io FIG. 3d includes the same fields as the reverse payout tables 146a-146c of the prior embodiments, and the same individual pay combinations. The reverse payout table 146d of FIG. 3d, however, represents an embodiment where the player makes the five coins available (i.e. slot machine 100 does not reduce the players credit balance by the amount of the wager before each play).

Figure 4A:
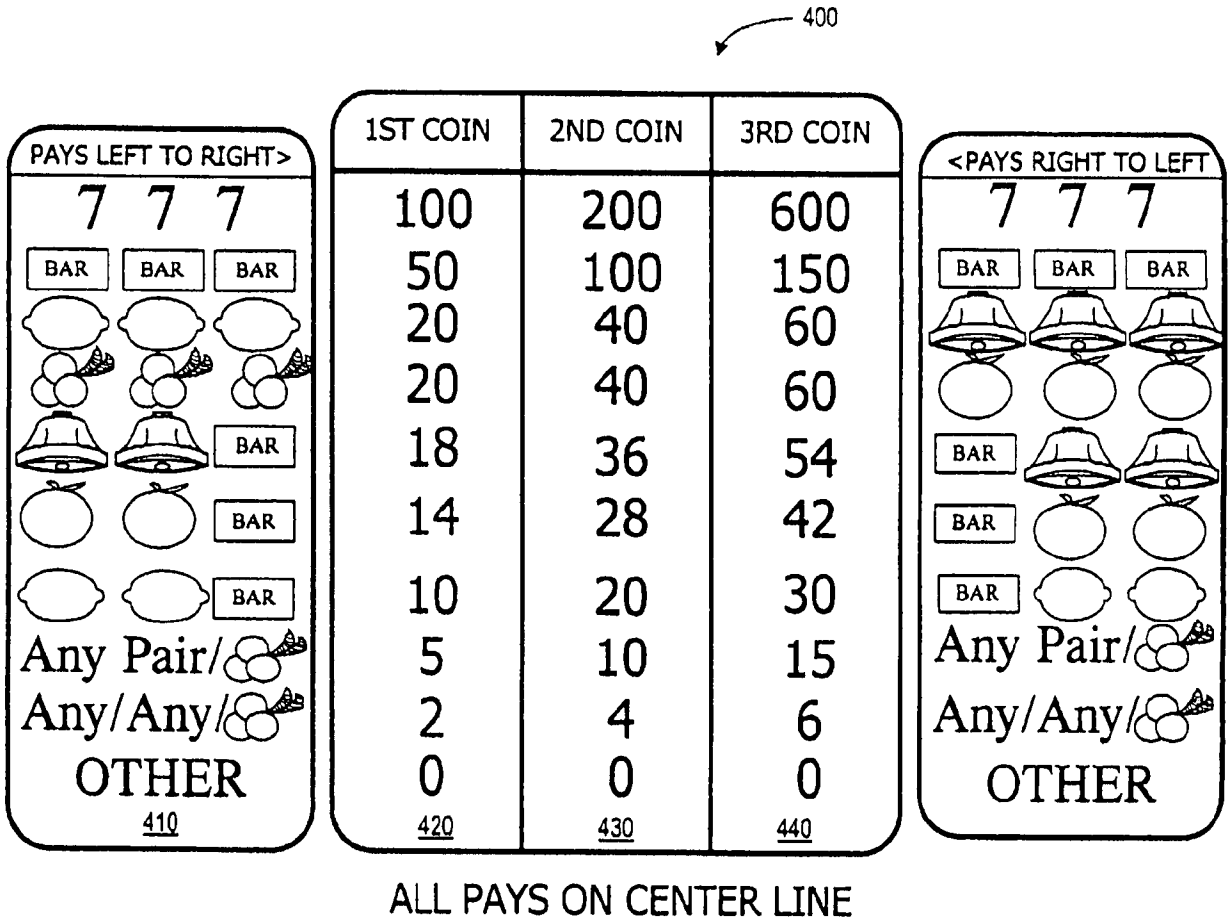
FIG. 4a is a normal payout table display of the slot machine of FIG. 1.

During normal payout mode, the slot machine 100 provides a normal payout display 400, as shown in FIG. 4a, on the video display area 138. The normal payout display 400 includes a pay combination field 410 which displays normally winning pay combinations. The normal payout display 400 also displays payout information for each pay combination. Specifically, in the present embodiment, the payout display 400 includes three fields of payout information, each directed to a different number of coins wagered. The "1ST COIN" field 420 includes the number of coins awarded when one coin is wagered, as indicated in field 212 of the normal payout table 128b. Similarly, the "2ND COIN" field 430 includes the number of coins awarded when two coins are wagered, and the "3RD COIN" field 440 includes the number of coins awarded when three coins are wagered.

Figure 4B:
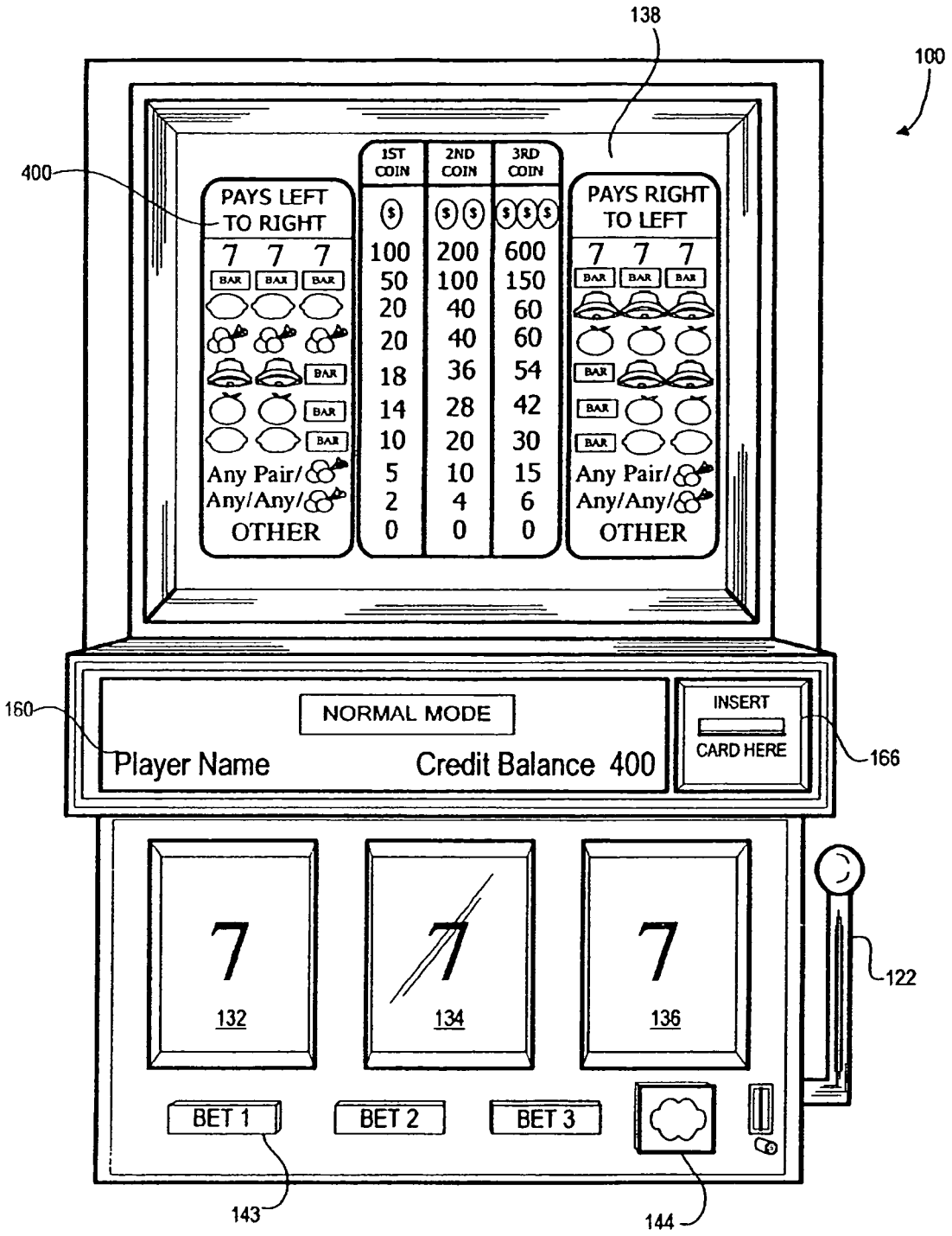
FIG. 4b is a plan view of a normal payout table enabled slot machine.
Figure 4C:
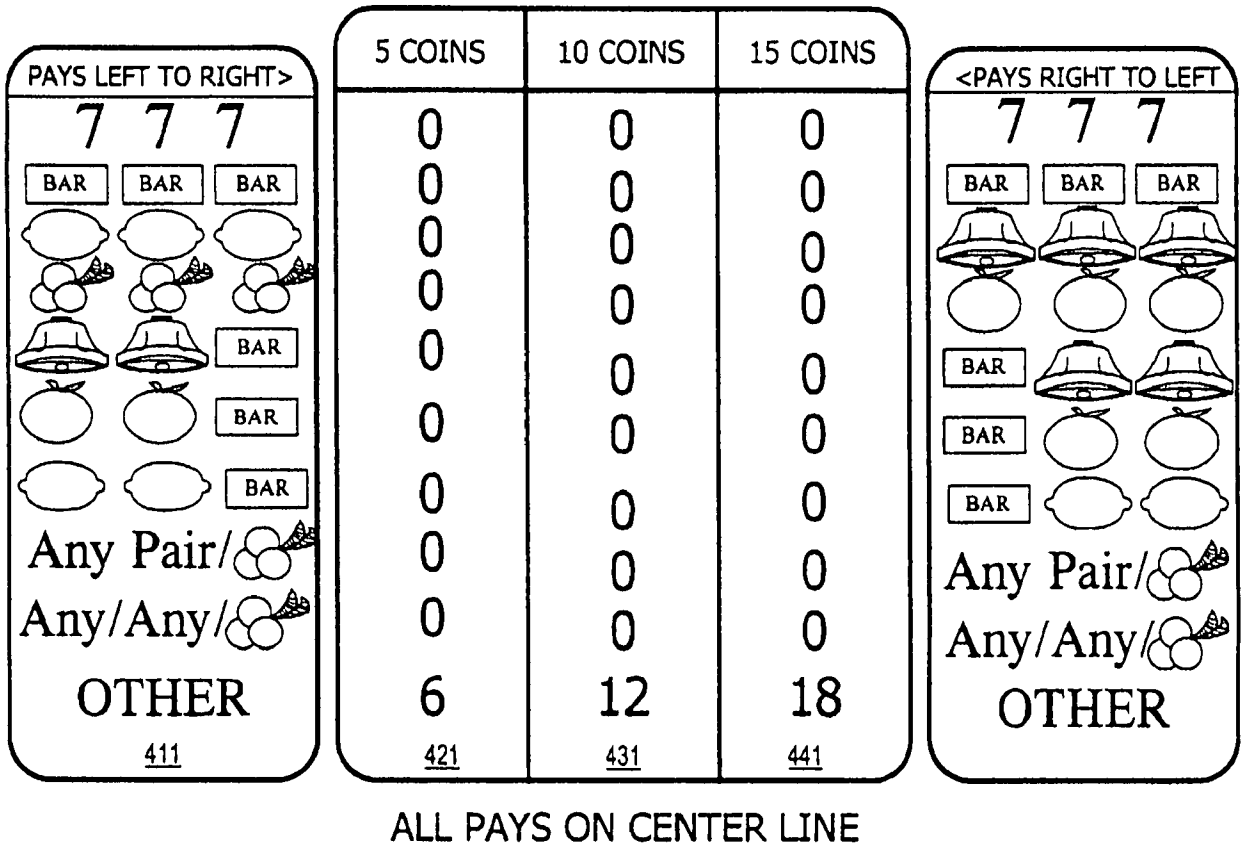
FIG. 4c is a reverse payout table display of the slot machine of FIG. 1.
Figure 4D:
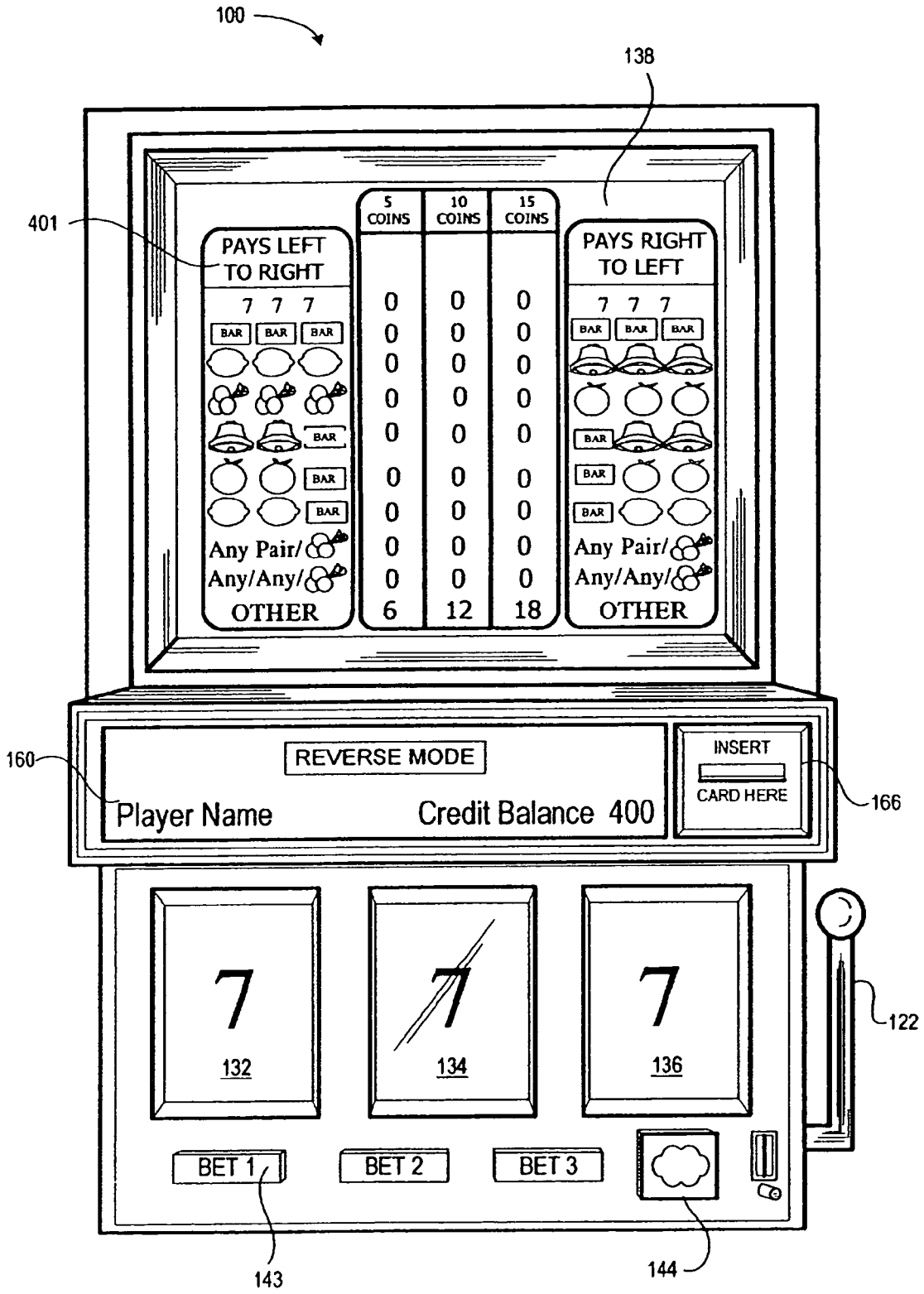
FIG. 4d is a plan view of a reverse payout table enabled slot machine.

FIG. 4d is a plan view of slot machine 100 in normal payout mode. Slot machine 100 is configured for normal play as is illustrated by the normal payout display 400 displayed in video display area 138.

During reverse payout mode, the slot machine 100 provides a reverse payout display 401, as shown in FIG. 4c, on the video display area 138. The reverse payout display 401 includes a pay combination field 411 which displays normally winning pay combinations and the ôOtherö pay combination. The reverse payout display 401 also displays payout information for each pay combination. Specifically, in the present embodiment, the payout display 401 includes three fields of payout information, each directed to a different number of coins wagered. The "5 COINS" field 421 includes the number of coins awarded when five coins are wagered, as indicated in field 332 of the reverse payout table 146c. Similarly, the "10 COINS" field 431 includes the number of coins awarded when ten coins are wagered, and the "15 COINS" field 441 includes the number of coins awarded when fifteen coins are wagered.

FIG. 4b is a plan view of slot machine 100 in reverse payout mode. Slot machine 100 is configured for reverse play as is illustrated by the reverse payout display 401 displayed in video display area 138.

Figure 5A:
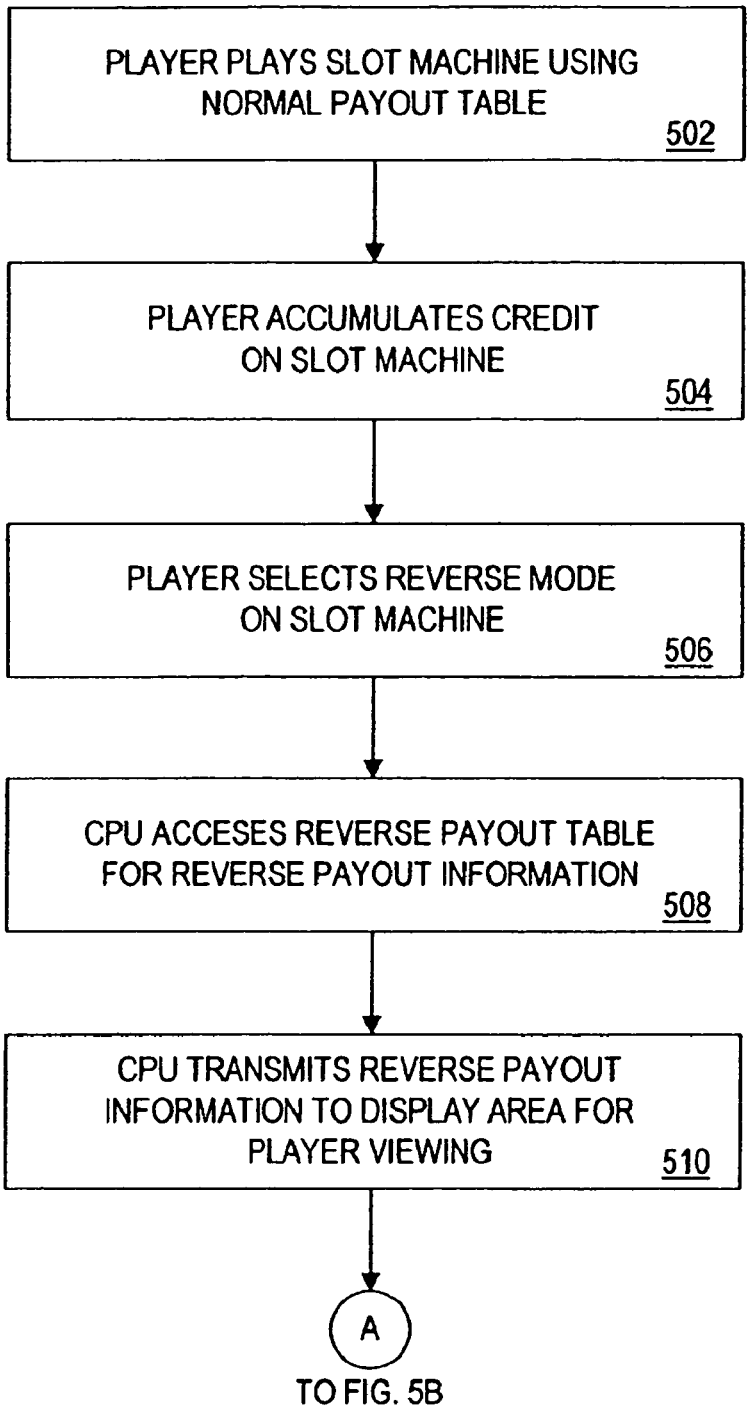
FIGS. 5a and 5b are flow diagrams depicting the operation of the slot machine of FIG. 1.

The operation of the present embodiment will now be described with reference to FIGS. 5a and 5b, and with continuing reference to FIGS. 1-3d. In a typical scenario, a player plays a slot machine 100, shown as step 502, using the normal payout table 128b.

While playing the slot machine 100 in normal payout mode, the player may accumulate credits on the slot machine 100 by hitting one or more jackpots. Having hit a jackpot and accumulated credits, shown in step 504, a player may decide that his or her "luck has run out" or the machine has 8gone cold.ö Rather than terminating play, the player may elect to switch to a reverse payout mode in an attempt to exploit his or the machines perceived bad luck. Thus, in step 506, the player selects reverse payout mode on the payout selector 144 of the slot machine 100. The CPU 110 receives a signal from the payout selector 144 in step 508 and accesses the reverse payout table 146c. Payout selector 144 could also select from among a set of possible reverse payout tables 146a-d, allowing the player a choice of different payout structures. Payout selector 144 may also be triggered automatically by slot machine 100. For example, after winning two jackpots with normal payout table 128b, the game may automatically switch to reverse payout table 146c, or at least indicate to the player that the option is available. Having accessed the reverse payout table 146c, the CPU 110 causes a reverse payout display 401 to be displayed on the video display area 138 in step 510. Alternatively, the information of reverse payout table 146c could be displayed on the belly glass of the slot machine along with the normal payout information as is customary for slot machines.

Figure 5B:
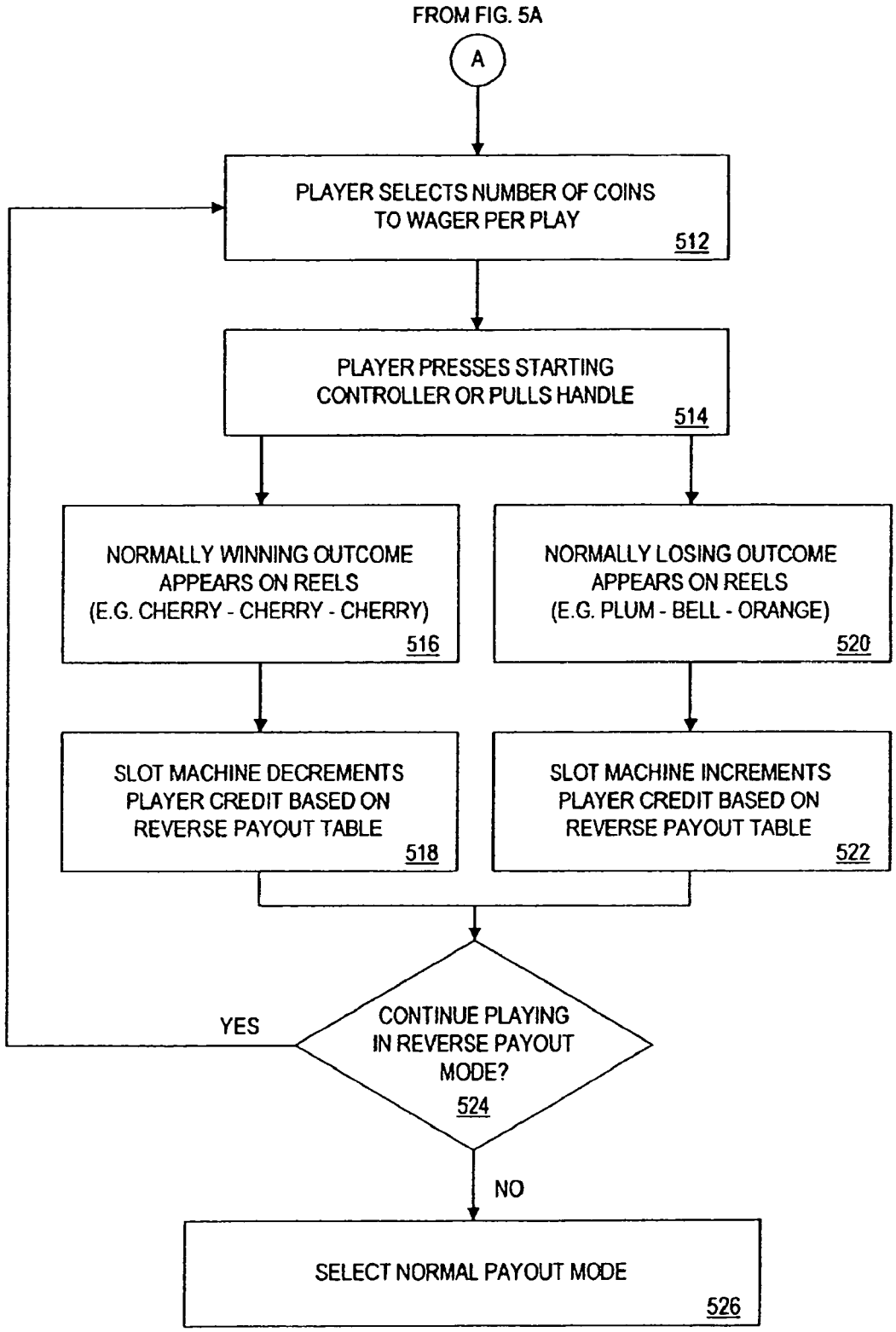
Figure 6:
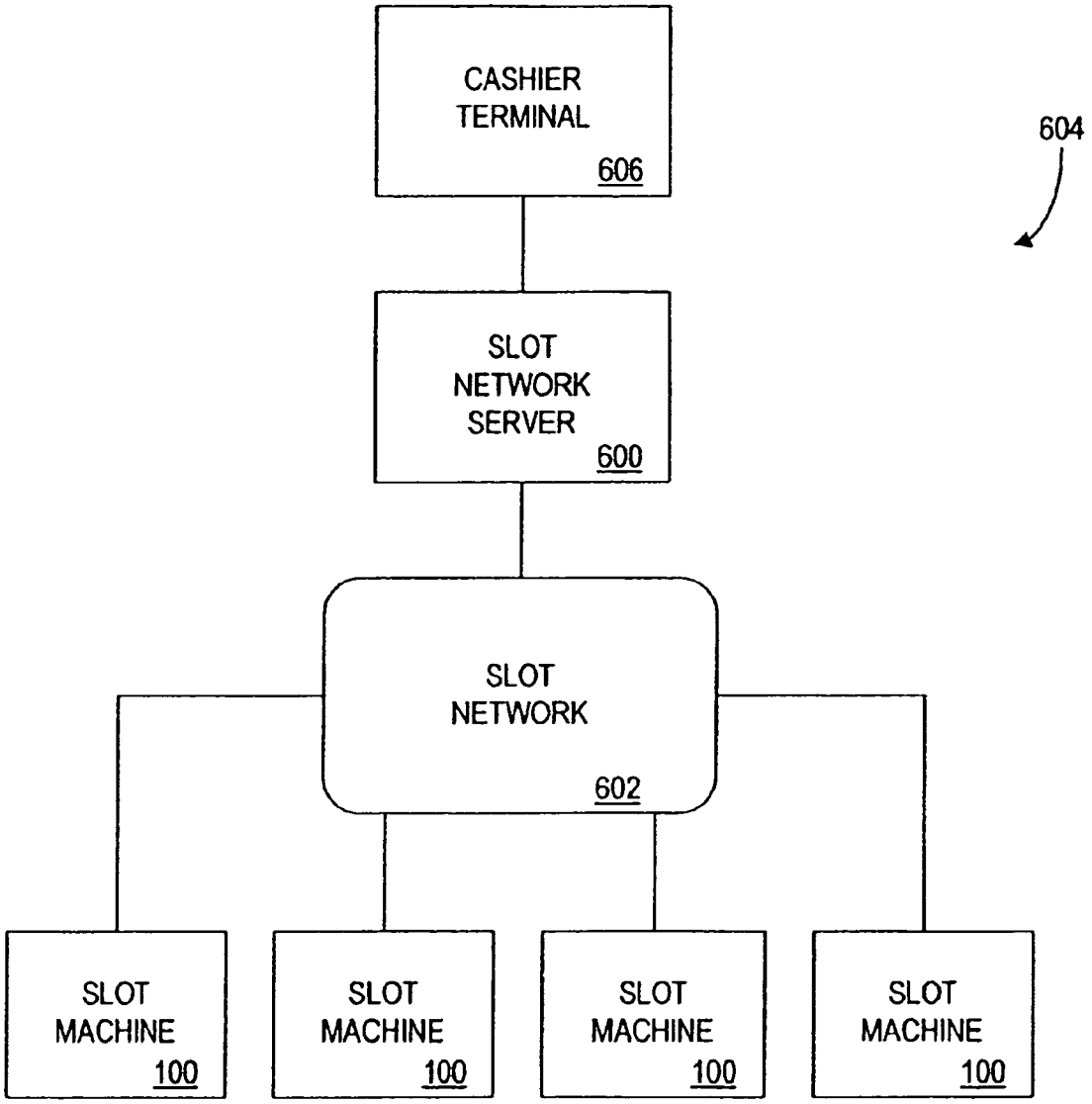
FIG. 6 is an overall schematic view of a system according to an alternate embodiment of the present invention, including a slot machine, a slot network server, and a cashier terminal.

As further described in FIG. 5b, the player then proceeds to initiate play of the slot machine 100 in the reverse payout mode. Specifically, in step 512, if the player has accumulated credits on the slot machine 100, then the player selects the number of coins to wager. Before continuing, the CPU 110 determines whether the player has enough accumulated credits stored to cover all potential losses, as indicated in the Player win/loss field 336 of reverse payout table 146c. For example, if the maximum possible loss is ninety-nine coins, then the player must deposit or make available funds equivalent to the value of the ninety-nine coins. In one embodiment, the player merely deposits enough coins in the coin acceptor 148. CPU 110 registers how many coins have been wagered. In step 514, the player presses the starting controller 122 or pulls a handle (not shown) to initiate the random number generator 120 and the spinning of reels 132, 134, 136.

As shown in step 516, the results from random number generator 120 and the probability table 126 may initiate CPU 110 to display a normally winning outcome, such as "CHERRY-CHERRY-CHERRY" on the reels 132, 134, 136. If such a normally winning outcome occurs, then, in step 518, the slot machine 100 decrements the player's stored credits based on the reverse payout table 146c. Decrementing the player's stored credits involves the CPU 110 accessing the reverse payout table 146c. CPU 110 proceeds to correlate the outcome, "CHERRY-CHERRY-CHERRY", to the "CHERRY/CHERRY/CHERRY" pay combination in the pay combination field 330, and to the corresponding loss of five coins in the Player win/loss field 336. Thus, in step 518, the CPU 110 adjusts the stored credits accordingly.

Another possibility, based upon the random number generator 120 and the probability table 126, is that a normally losing outcome, such as "PLUM-BELL-ORANGE" may appear on the reels 132, 134, 136. The occurrence of a normally non-winning outcome is shown as step 520. If such a normally non-winning outcome occurs then in step 522, the slot machine 100 increments the players credits based on the payout information in the reverse payout table 146c. Specifically, the CPU 110 accesses the reverse payout table 146c to identify the Player win/loss amount 336 corresponding to the particular outcome and pay combination. The CPU 110 proceeds to adjust the stored credits accordingly, in this example adding six coins to the players credit balance.

Regardless of whether a normally winning or normally losing outcome occurs, in step 524 the player decides whether or not to continue playing in the reverse payout mode. If the player decides to continue playing in a reverse payout mode, then the operation continues from step 512. On the other hand, a player may decide not to continue playing in the reverse payout mode. For example, a player may perceive his or her luck is improving or that the slot machine 100 is "due to hit" or ôgetting hot.ö Thus, in step 526, rather than leaving the machine, the player uses the payout selector 144 to select normal payout mode.

In an alternate embodiment, the slot machine 100 includes only the reverse payout table 146c and not the normal payout table 128b. With such a slot machine 100, the normally winning outcomes, although not identified in any normal payout table, are typically pre-determined and identified to the player in the form of a display. As in the previously described embodiment, the embodiment having only a reverse payout table will prevent a player from stopping play or leaving the casino based on perceived bad luck. In such an embodiment, the slot machine operates as described above with reference to steps 512-524 of FIG. 5b.

An alternate embodiment will now be described with reference to FIGS. 6-11, and with continuing reference to FIGS. 1-3d. In general, the embodiment to be described allows a player to wager on the play of a slot machine in reverse payout mode without relying solely on credits stored at or coins deposited into the slot machine 100. Instead, the player uses a player tracking card that identifies a credit balance stored by a slot network server. The information stored by the server may include a credit balance, a credit card number, a complimentary points awarded total, and the like. This information is used as a source of funds or points for a player to wager.

More specifically, such an embodiment includes multiple slot machines 100 in communication with a slot network server 600 via a conventional local area network (slot network) 602. The slot network 602 is controlled by the slot network server 600. It is to be understood that communication between each slot machine 100 and the slot network server 600 may also occur across a wireless network or Internet connection. A cashier terminal 612 is also coupled to the slot network server 600.

As will be discussed in greater detail below, each slot machine 100 communicates outcome data to the slot network server 600. As used herein, outcome data includes all game activity-related information, which is being passed from a slot machine 100 to the slot network server 600. In the present embodiment, such outcome data includes the Number of coins wagered, the Player win/loss amount, and the position of the reels 132, 134, 136 on the slot machine 100. Thus, outcome data includes any given outcome and the payout information for that outcome. As discussed below, in an alternate embodiment, such outcome data also includes an indication of which payout mode, either normal or reverse, the slot machine 100 is operating in. It will be understood that the position of the reels 132, 134, 136 and the payout information are essentially alternate representations of the same data.

Because each slot machine 100 has a unique machine identification (ID) number, the slot network server 600 is able to distinguish the outcome data as being sent from a particular slot machine 100 and to store the outcome data with reference to that particular machine 100.

To facilitate the communication between a player, the slot machine 100 and the slot network server 602, a casino typically issues a player tracking card containing player identifying information. Such identifying information can be any information that uniquely identifies a player to the system and, in the present embodiment, includes the player identification (ID) number. The identifying information is preferably stored on a magnetic strip on the player tracking card.

The player tracking card reader 166 reads the player identifying information from the player tracking card and communicates the information to the CPU 110, which in turn communicates the identifying information to the slot network server 600. Because the player identifying information uniquely identifies a given player, the slot network server 600 is able to access information associated with that player, such as a credit balance.

Figure 7:
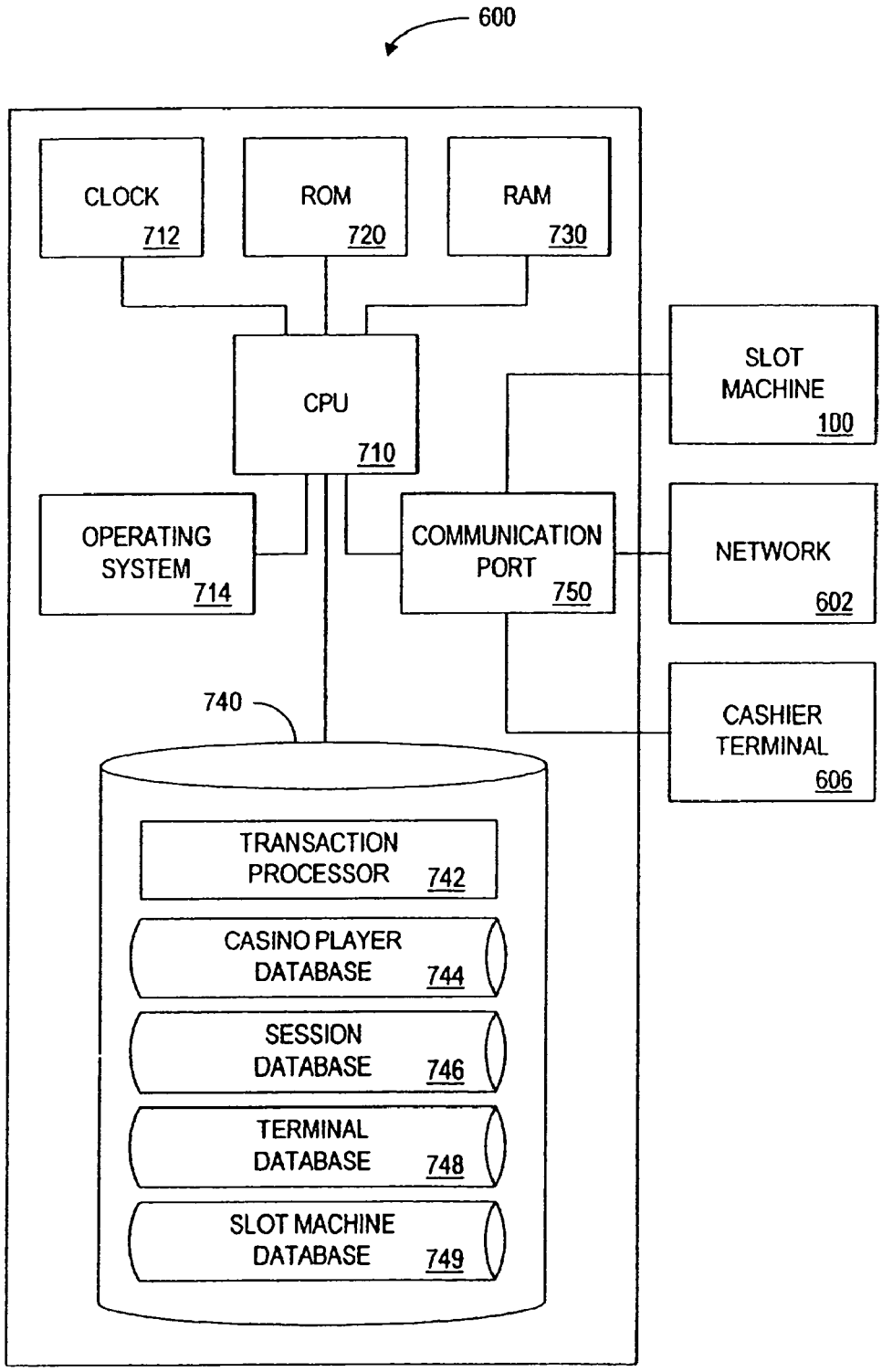
FIG. 7 is a schematic view of the slot network server of FIG. 6.

With reference to FIG. 7, the slot network server 600 will now be described in greater detail. Like the slot machine 100 of FIG. 1, the slot network server 600 has a Central Processing Unit (CPU) 710. The CPU 710, which has a clock 712 and operating system 714 associated therewith, executes instructions of a program stored in either Read Only Memory (ROM) 720 or Data Storage Device 740. During execution of the program instructions, the CPU 710 temporarily stores information in the Random Access Memory (RAM) 730.

In order to communicate with the cashier terminal 606, the slot network server 600 also includes a communication port 750. The communication port 750 is coupled to the CPU 710, as well as to the slot machine network 602 and the cashier terminal 606. Thus, the CPU 710 can control the communication port 750 to receive and transmit information from each slot machine 100, and the cashier terminal 606.

Additionally, the CPU 710 is coupled to a data storage device 740, having a transaction processor 742, a casino player database 744, a session database 746, a terminal database 748, and a slot machine database 749. In general, the transaction processor 742 manages the contents of the data storage device 740, and may comprise a dedicated processor, or a portion of the function of processor 710.

In general, the casino player database 744 of the present embodiment, as shown in FIG. 8, includes multiple records having multiple fields of information related to player identification. Specifically, the player database 744 comprises multiple records, each record being associated with a particular player, as identified by a player identification (ID) number. The fields within each record include: name 7440, player ID number 7442, player address 7443, credit card number 7445, credit balance 7446, complimentary information 7447 (such as complimentary points accumulated), and player status rating 7449. Having information related to one field, such as player ID number 7442, allows the slot network server 600 to index all information stored in the other fields of that player's record.

It is to be understood that for purposes of the present embodiment, only the player ID number field 7442, and the credit balance field 7446 are necessary. The remaining fields are merely representative of additional information that may be stored and used for other purposes in the present embodiment. For example, credit card number 7445 is used for billing purposes and address 7443 is used to mail casino promotions to players to incent them to return to the casino.

The slot machine database 749 relates to information concerning particular slot machines 100. As illustrated in FIG. 9, each slot machine 100 has an associated record in the database identified by a machine ID number, as stored in the machine ID number field 7491. The other fields in the slot machine database 749 include: player ID number 7492, payout 7494, amount wagered 7497, payout mode 7498, and payout table identifier 7499.

Figure 10:
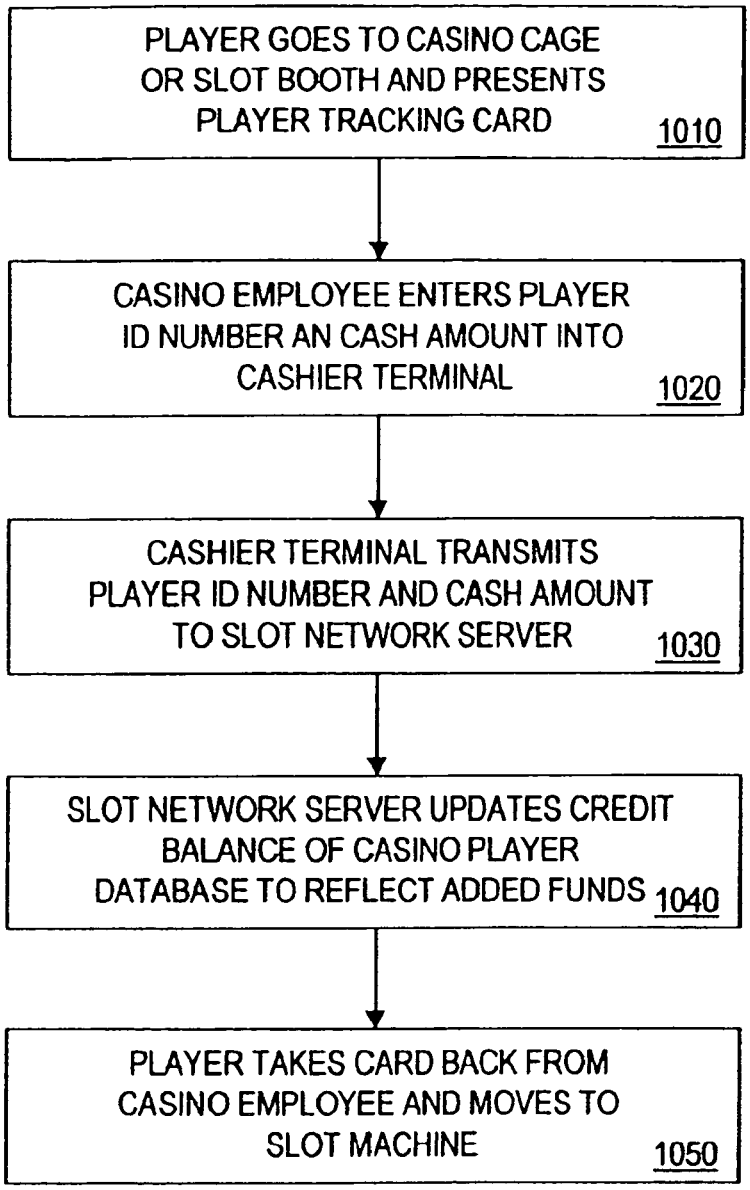
FIG. 10 is a flow diagram describing the depositing of funds for use with the system of FIG. 6.
Figure 11:
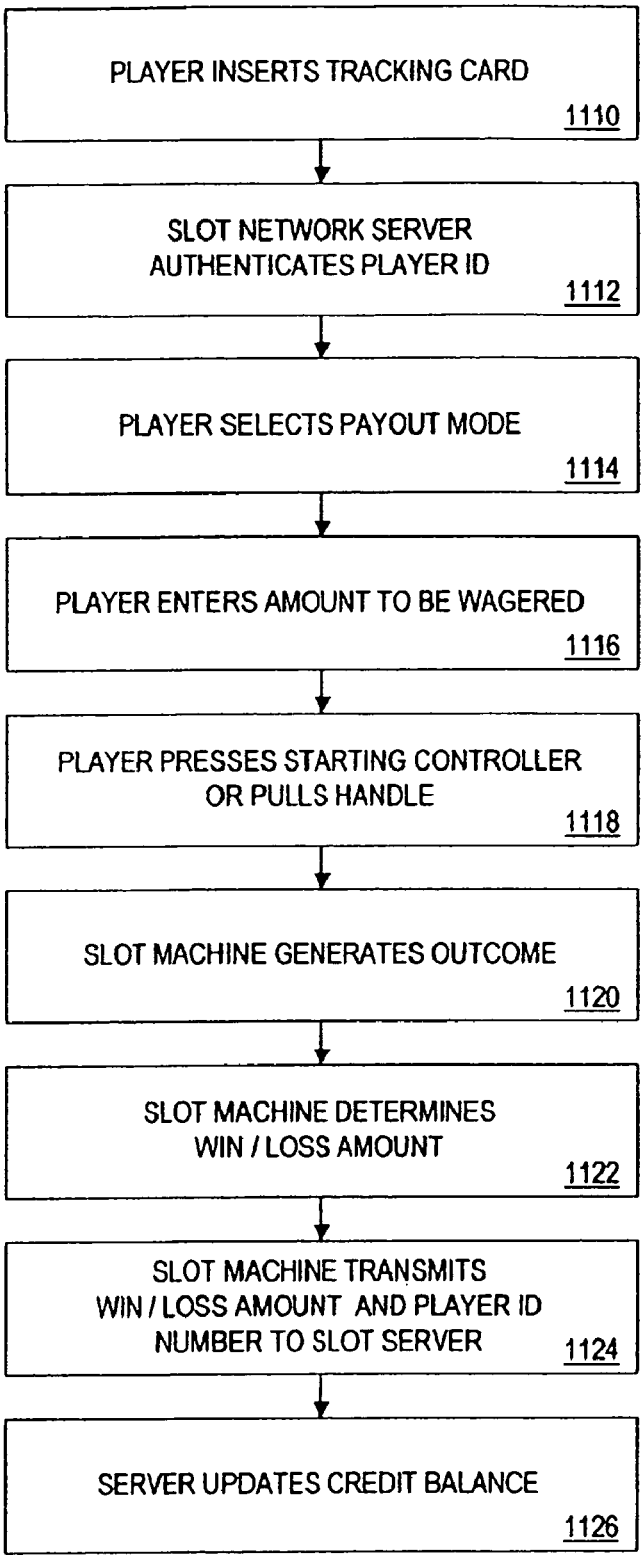
FIG. 11 is an overall flow diagram of the operation of the system of FIG. 6.

Having thus described the components of the present embodiment, the operation of the system 604 will now be described in greater detail with reference to FIG. 10, and continuing reference to FIGS. 1, 2a-c, 3a-d, 5a, 5b and 6-9. It is to be understood that the programs stored in ROM 720 of the slot network server 600 and ROM 116 of the slot machine 100 provide the function described below.

The process of adding funds to the player's credit balance 7446 will now be described with reference to FIG. 10. Initially, in step 1010, the player goes to a casino cage or slot booth and presents the player tracking card to a casino employee. The casino employee proceeds, in step 1020, to read the player identifying information, namely the player ID. The casino employee then enters the player ID and the amount of funds being deposited by the player into the cashier terminal 606. Alternatively, the player provides a credit card number to which any losses can be charged by the casino.

In step 1030 the cashier terminal 606 transmits the player ID and the amount of funds deposited to the slot network server 600. Once the server 600 receives the player ID and the amount of funds deposited, the server CPU 710 causes the transaction processor 742 to access the casino player database 744. More specifically, the transaction processor 742 searches the casino player database 744 for the record containing the received player ID in the player ID field 7442. Having thus located the appropriate record, in step 1040, the transaction processor 742 increments the credit balance field 7446 by the amount of funds deposited. Once the player database 744 has been updated, the player takes the player tracking card back from the casino employee in step 1050 and proceeds to the slot machine 100.

The player does not have to use cashier terminal 606 to add money to credit balance 7446. Instead the player may provide money or account data directly into slot machine 100, which in turn transmits the credit data to slot server 600. In such embodiments, the slot machine 100 could be equipped with either a smart card or credit card reader. The player is making these funds available such that any losses sustained while playing the reverse mode on the slot machine 100 will be covered by those funds prior to the actual loss. Initiation of play will now be described with reference to FIG. 11 and continuing reference to FIGS. 1, 7, 8 and 9.

Having thus established a credit balance 7446, the player may initiate play of a slot machine 100. The CPU 110 transmits a signal to the slot network server 100 indicating funds have been received.

As shown as step 1110, the slot machine player first inserts the player tracking card into the card reader 166. The card reader 166 then proceeds to read the player identifying information from the tracking card. The player identifying information, namely the player ID, is communicated from the slot machine 100 to the slot server 600. Upon receiving the player identifying information, the slot server 600 authenticates the information. This step, depicted as step 1112, includes the slot network server 600 searching the casino player database 744 for a record containing the received player ID in field 7442. The server 600 also stores the player ID number in the field 7492 of the record in the slot machine database 749. Once the slot network server 600 authenticates the player identifying information, the server 600 may transmit a signal to the slot machine 100 acknowledging such authentication.

In step 1114, displayed on either display 162 or video display area 138, the player selects either normal payout mode or reverse payout mode on the payout selector 144. This selection may be prompted by a message from slot machine 100. The slot machine 100 also prompts the player to enter the amount to be wagered on the upcoming play. Specifically, as shown in step 1116, the player enters the number of coins to be wagered into the keypad 164, or, in an alternate embodiment, a touch screen of the video display area 138 or use of buttons. The slot machine 100 registers the amount to be wagered by the player and stores the value in the RAM 118.

Having selected the payout mode and entered the amount to be wagered, the player presses the starting controller 122 or pulls the handle to begin play in step 1118. As discussed above, the slot machine 100 generates an outcome based upon a number randomly generated by random number generator 120, the random number corresponding to a reel combination in probability table 126. Once the slot machine 100 generates an outcome, which is shown as step 1120, it determines the appropriate player win/loss amount. Specifically, in step 1122, the CPU 110 accesses either the normal payout table 128c or an appropriate reverse payout table such as 146a or 146d, and correlates the outcome to the player win/loss amount as stored in fields 226, 326, 346 respectively, depending on the mode of play and the appropriate reverse payout table. It should be noted that instead of accessing the Player win/loss field, slot machine 100 could access the Number of coins awarded field in the appropriate payout table to determine the payout to the player.

The slot machine 100 transmits the number of coins awarded information and player ID number to the slot network server 600 in step 1124. Having received the Player win/loss amount and the player ID number, the slot network server 600 proceeds to update the player's stored credit balance.

Updating the player's credit balance, shown as step 1126, involves the CPU 710 directing the transaction processor 742 to access the casino player database 744 in order to locate the record containing the received player ID number in field 7442. The transaction processor 742 then adjusts the value stored in credit balance field 7446 by the received Player win/loss amount.

Once the slot network server 600 has adjusted the player's credit balance accordingly, operation of the system 604 may repeat from step 1114 until either the server 600 determines the player has insufficient funds stored in the credit balance 7446 to play or the player decides to stop playing and removes the tracking card from the card reader 166.

If the player stops playing and desires to cash out, the player merely goes to the casino cage or slot booth and presents his tracking card. As with the depositing of funds, described above, the server 600 accesses the player's record and adjusts the credit balance field 7446. Rather than incrementing the credit balance 7446, however, the slot network server 600 decrements the stored value by the amount dispersed by the casino employee to the player.

Figure 12:
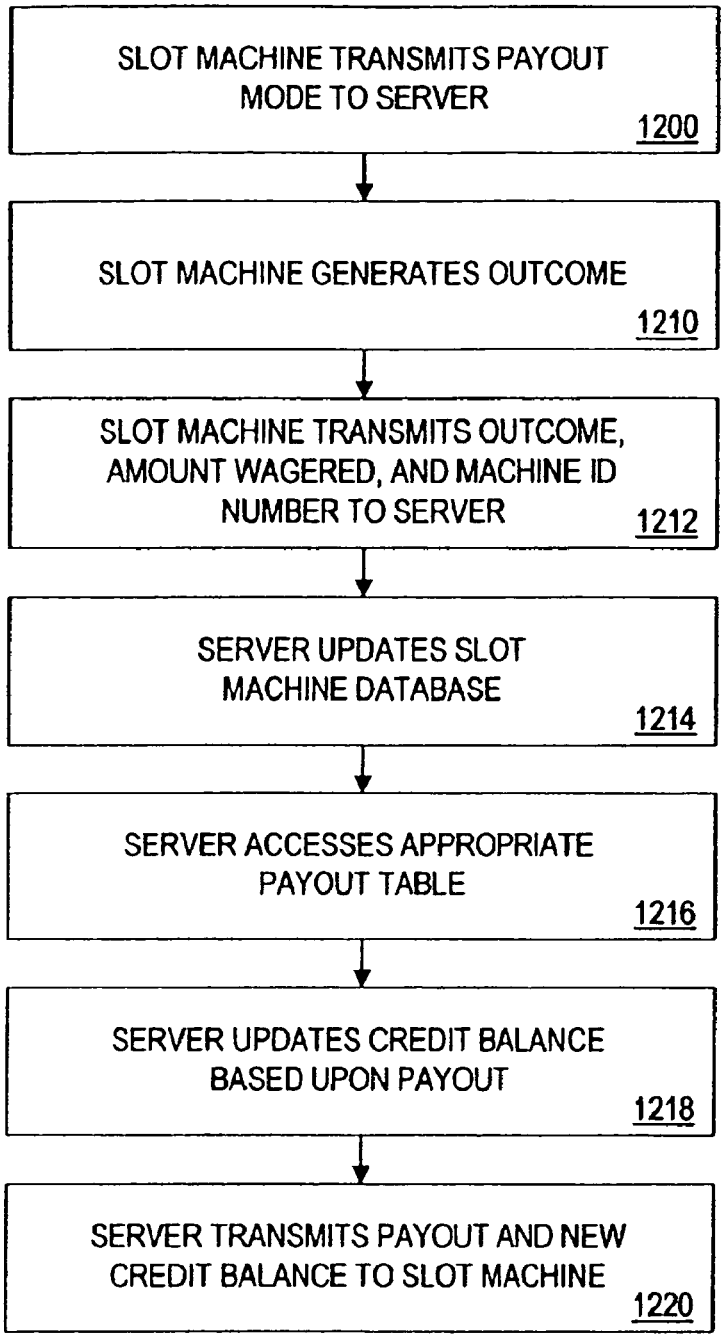
FIG. 12 is an overall flow diagram of an alternate embodiment of the present invention.

An alternate embodiment employing the system 604 will now be described with reference to FIG. 12 and continuing reference to FIGS. 1, 2a-c, 3a-d, and 7-9. In this embodiment, the slot machine 100 does not contain payout tables. Instead, the payout tables are stored in the slot network server 600. As noted above, the slot machine database 749 contains a payout mode 7498 which identifies what mode of play, normal or reverse, slot machine 100 is operating in. Furthermore, because the payout tables are stored at the slot network server 600, the same payout tables may be used by multiple slot machines 100. In such an arrangement, the slot machine database 749 would contain a payout table identifier 7499 to a location in memory, such as the data storage device 740 or the RAM 730, where the appropriate payout table is stored. Thus, the slot machine database 749 at least indirectly contains payout information.

Initially, in step 1200, the slot machine 100 transmits an indication of the payout mode selected by the player to the slot network server 600. The slot network server 600 stores this indication in the payout mode field 7498 of that particular slot machine's record in the slot machine database 749. As with the previously described embodiments, the slot machine 100 then generates a random number and a corresponding outcome, namely reel positions in the present embodiment, in step 1210. In step 1212, the slot machine 100, having generated an outcome, transmits the outcome to the slot server 600. Along with the outcome, the slot machine 100 transmits the amount wagered and the machine ID number so that the slot server 600 can identify from which machine the outcome originated.

Once the slot network server 600 receives the outcome and amount wagered, it updates the slot machine database 749 in step 1214. More specifically, the slot network server 600 accesses the slot machine database 749 and updates the record pertaining to the particular slot machine 100, as identified by its machine ID number 7491, with the amount wagered 7497.

After updating the slot machine database 749, the slot server 600, proceeds to update the credit balance field 7446 in the player's record having the same player ID number in field 7442 as found in the player ID number field 7492 of the slot machine database 749. The credit balance field 7446 is adjusted by the player win/loss amount from the appropriate payout table.

Specifically, the server 600 determines the payout by retrieving the address stored in either the payout mode field 7498 or the payout table indicator field 7499. The CPU 710 then accesses the payout table stored at the retrieved address in RAM 730 or Data Storage Device 740 and, based upon the stored outcome 7493 and amount wagered 7497, retrieves the corresponding payout. Accessing the payout table is shown as step 1216. The CPU 710 then in step 1218 causes the transaction processor 742 to adjust the credit balance field 7446 by the amount of Player win/loss 7494.

Once the server 600 determines the player win/loss and adjusts the player's credit balance 7446, the server 600 transmits the player win/loss amount and the new credit balance 7446 to the slot machine 100 for display to the player in step 1220.

It is to be understood that reverse payout tables other than those shown in FIGS. 3a-3d are within the scope of the present invention. Such other reverse payout tables include payout schedules which are more or less favorable to the player, or schedules which result in a greater frequency of positive payouts in exchange for larger losses for the remaining losing outcomes and are based on different amounts of coins wagered.

Alternatively, the present invention can also substitute the use of algorithms for reverse payout tables 146a-d. One such algorithm is applied to the Player win/loss fields 216,226,236 of normal payout tables 128a-c, and may be stored in data storage device 124 or ROM 116 of slot machine 100. The algorithm takes the normal Player win/loss 216,226,236 as an input and returns the corresponding reverse Player win/loss 316,326,336,346. The algorithm looks like the following:

1. If the normal player win/loss is a win of greater than five coins, then the reverse player win/loss is a loss of five coins.
2. If the normal player win/loss is a win of between zero and five coins, then the reverse player win/loss is a loss of two coins.
3. If the normal player win/loss is zero or a loss of some number of coins, then the reverse player win/loss is a win of one coin.

Another algorithm takes the Number of coins awarded 212,222,232 of one of the normal payout tables 128a-c as an input and returns the Player win/loss 316,326,336,346 of one of the reverse payout tables 146a-d.

1. If the normal Number of coins awarded is greater than zero, then the reverse Player win/loss is a loss of one fewer coins.
2. If the normal Number of coins awarded is equal to zero, then the reverse Player win/loss is a win of one coin.

The above described payout results may also be produced by altering the probability of each pay combination as depicted in any of the normal payout tables 128a-c. In this manner, pay combinations with high or medium payouts have their probability of hitting lowered, while pay combinations of low end payouts have their probability increased.

Another way to shift the odds in favor of the house is to alter the probabilities of the outcomes. Specifically, the probability table 126 is adjusted so that normally winning outcomes, which result in a loss to the player, are more likely while normally non-winning outcomes, which result in a payout to the player, are less likely while in reverse payout mode.

It is to be understood that the normal payout tables 128a-c and the reverse payout tables 146a-d may include some of the same Player win/loss amounts. For example, in an alternate embodiment using the reverse payout tables of FIGS. 13a and 13b, the payout for the least likely outcome (and the highest jackpot)—"7-7-7"—is positive in both the normal payout tables 128a-c and reverse payout tables 1300a-b. By retaining the highest positive win in the reverse payout tables 1300a-b, players will be further encouraged to play the slot machine 100 in reverse payout mode knowing that winning the highest jackpot is still possible. Further in this regard, it is within the scope of the present invention to make other jackpots available in the reverse payout table 1300 and to make one or more jackpots available in any of the reverse payout tables described herein.

It is also to be understood that embodiments in which players make nonmonetary wagers are also within the scope of the present invention. Thus, in one embodiment, a player wagers complimentary points, as stored in the "COMP-.INFO" field 7447 of the casino player database 744. Such an embodiment operates similar to the system 604 described above with the exception that the payouts relate to complimentary points, not coins, and the "COMP.INFO" field 7447, not the credit balance field 7446, is adjusted based upon the payouts. Upon a player cashing out, the casino could convert the accumulated complimentary points into any kind of award, including free hotel rooms, dinners, tickets to shows, free plays on a gaming device, money, and the like.

In an embodiment in which the gaming device is a video poker machine, card values represent the outcome display instead of reel symbols. In this game, the player receives five cards and then has the option to draw five new cards. The resulting completed hand is paid according to a payout schedule that typically rewards rare hands such as a royal or straight flush with a large coin award. Hands like a full house or flush receive medium payouts while a small pair or no pair hand generally earns the player no payout at all. In a reverse payout table, players are rewarded for low value hands. Much like lowball poker, the player is rewarded for having the worst hands.

Although the present invention has been described in terms of certain preferred embodiments, other embodiments that are apparent to those of ordinary skill in the art are also intended to be within the scope of the present invention. Accordingly, the scope of the present invention is intended to be limited only by the claims appended hereto.

What is claimed is:

[1. A gaming device wherein a play generates one of multiple possible outcomes, the device comprising:

a wager selector indicating a wager;

a memory device storing a first set of data correlating possible outcomes to a first set of payout information and a second set of data correlating possible outcomes to a second set of payout information, said second set of data being structured such that the statistical likelihood of generating any winning outcome is greater than the statistical likelihood of generating any losing outcome;

selector means for selecting either of said first set of data or said second set of data;

an insurance selector;

a random number generator for generating a random number;

said memory device also storing a third set of data correlating possible outcomes to insurance payout information; and a processor coupled to said random number generator, said memory device, said payout selector and said insurance selector, said processor configured to access said insurance payout information based on said random number and said insurance selector.]

[2. The gaming device of claim 1 wherein said second set of data is structured such that the statistical likelihood of generating any winning outcome is greater than the statistical likelihood of generating any outcome which results in neither win nor a loss.]

[3. The gaming device of claim 1 further comprising:

means for generating a random number wherein said random number corresponds to one of said multiple possible outcomes; and processor means coupled to said memory means for accessing one of said first set of data and said second set of data based upon said selector means.]

[4. The gaming device of claim 1 further comprising means for receiving payment from a player, said means for receiving coupled to said processor means, said processor means determining a payout based on said payment.]

[5. A slot machine wherein a play results in one of multiple possible outcomes, each outcome including a plurality of reel positions, the slot machine comprising:

a memory device having payout information stored therein, said payout information correlated to said outcomes such that each outcome in which each of the reel positions differs from each other is a win for a player.]

[6. The slot machine of claim 5 further comprising a processor coupled to said memory device and configured to determine a win or loss according to the resulting outcome and said payout information.]

[7. The slot machine of claim 5 wherein said payout information correlated to an outcome in which at least two reel positions are identical describes a loss for a player.]

[8. A gaming device wherein a play results in one of multiple possible outcomes, the outcomes including normally winning outcomes and normally non-winning outcomes, the gaming device comprising:

a memory device having stored therein payout information correlated to possible outcomes, and wherein said payout information correlates other than a win for a player to a normally winning outcome, wherein said normally winning outcomes include outcomes in which at least two of the reel positions are identical.]

[9. The gaming device of claim 8 wherein said payout information correlates a win to a normally non-winning outcome.]

[10. A gaming device operable to generate one of a plurality of possible outcomes for each play initiated thereon, the device comprising:

means for storing a first payout table including a first plurality of payout amounts, each of the first plurality of payout amounts corresponding to at least one of the plurality of possible outcomes, wherein each possible outcome has only one of said first plurality of payout amounts associated therewith;

means for storing a second payout table including a second plurality of payout amounts, each of the second plurality of payout amounts corresponding to at least one of the plurality of possible outcomes, wherein each possible outcome has one of said second plurality of payout amounts associated therewith, and wherein at least one of the second plurality of payout amounts associated with a first particular outcome is greater than zero when a corresponding one of said first plurality of payout amounts for the first particular outcome is zero, and wherein at least one of the first plurality of payout amounts associated with a second particular outcome is greater than zero when a corresponding one of said second plurality of payout amounts for the second particular outcome is zero; and means for indicating which of said first and said second payout tables the gaming device is to access for a play.]

[11. A computer readable medium encoded with processing instructions for implementing a method for operating a gaming device, the method comprising:

storing a first payout table including a first plurality of payout amounts, each of the first plurality of payout amounts corresponding to at last one of the plurality of possible outcomes, wherein each possible outcome has only one of said first plurality of payout amounts associated therewith;

storing a second payout table including a second plurality of payout amounts, each of the second plurality of payout amounts corresponding to at least one of the plurality of possible outcomes, wherein each possible outcome has one of said second plurality of payout amounts associated therewith, and wherein at least one of the second plurality of payout amounts associated with a first particular outcome is greater than zero when a corresponding one of said first plurality of payout amounts for the first particular outcome is zero, and wherein at least one of the first plurality of payout amounts associated with a second particular outcome is greater than zero when a corresponding one of said second plurality of payout amounts for the second particular outcome is zero; and receiving an indication which of said first and said second payout tables the gaming device is to access for a play.]

[12. A gaming device operable to generate one of a plurality of possible outcomes for each play initiated thereon, the device comprising:

means for storing a first payout table including a first plurality of payout amounts, each of the first plurality of payout amounts corresponding to at least one of the plurality of possible outcomes, the first payout table having a first payout amount associated with a first outcome, wherein the first payout amount is greater than zero, the first payout table further having a second payout amount associated with a second outcome, wherein the second payout amount is zero;

means for storing a second payout table including a second plurality of payout amounts, each of the second plurality of payout amounts corresponding to at least one of the plurality of possible outcomes, wherein at least one of the second plurality of payout amounts is greater than zero when a corresponding one of the first plurality of payout amounts is zero, the second payout table having a third payout amount associated with the first outcome, wherein the third payout amount is zero, the second payout table having a fourth payout amount associated with the second outcome, wherein the fourth payout amount is greater than zero; and means for receiving an indication which of said first and said second payout tables the gaming device is to access for the play.]

[13. A computer readable medium encoded with processing instructions for implementing a method for operating a gaming device, the method comprising:

storing a first payout table including a first plurality of payout amounts, each of the first plurality of payout amounts corresponding to at least one of the plurality of possible outcomes, the first payout table having a first payout amount associated with a first outcome, wherein the first payout amount is greater than zero, the first payout table further having a second payout amount associated with a second outcome, wherein the second payout amount is zero;

storing a second payout table including a second plurality of payout amounts, each of the second plurality of payout amounts corresponding to at least one of the plurality of possible outcomes, wherein at least one of the second plurality of payout amounts is greater than zero when a corresponding one of the first plurality of payout amounts is zero, the second payout table having a third payout amount associated with the first outcome, wherein the third payout amount is zero, the second payout table having a fourth payout amount associated with the second outcome, wherein the fourth payout amount is greater than zero; and receiving an indication of which of said first and said second payout tables the gaming device is to access for the play.]

[14. The gaming device of claim 10, wherein the device is a video poker machine, the plurality of possible outcomes including combinations of playing cards.]

[15. A gaming device comprising:

a first payout table including a first plurality of payout amounts and a plurality of outcomes wherein each of the plurality of outcomes is associated with at least one of the first plurality of payout amounts;

a second payout table including a second plurality of payout amounts wherein each of the plurality of outcomes is associated with at least one of the second plurality of payout amounts, wherein at least one of the first plurality of payout amounts associated with a first outcome of the plurality of outcomes is greater than zero if a payout amount of the second plurality of payout amounts associated with the first outcome is zero, and wherein at least one of the first plurality of payout amounts associated with a second outcome of the plurality of outcomes is zero if a payout amount of the second plurality of payout amounts associated with the second outcome is greater than zero; and a selector for indicating which of the first and second payout tables the gaming device is to use for determining a payout.]

[16. The gaming device of claim 15 wherein the first and second payout tables include information corresponding to a number of coins to be paid a player.]

[17. The gaming device of claim 15 further including a memory for storing a wager and wherein the first and second payout tables include information corresponding to a multiplier by which said payout is to be multiplied based upon the wager.]

[18. The gaming device of claim 15 further comprising:

a memory for storing the payout tables;

a random number generator for generating a random number; and a processor coupled to the random number generator, the memory, and the selector, wherein the processor is configured to access the payout tables based on the random number and the payout selector.]

[19. The gaming device of claim 18 further comprising:

an insurance selector coupled to the processor, wherein the memory further stores data that relates outcomes of the plurality of outcomes to insurance payout information and wherein the processor is configured to access the insurance payout information based on the random number and the insurance selector.]

*20. A method of operating a gaming system, the method comprising:*

*(a) providing a plurality of different payout tables including a first payout table and a second payout table, said first payout table including a plurality of first outcomes and a plurality of second outcomes, and said second payout table including the plurality of first outcomes and the plurality of second outcomes;*

*(b) prior to any wager being placed by a player on a first game instance and a second game instance:*

*(i) designating each of said first outcomes of the first payout table as winning outcomes and designating each of said second outcomes of the first payout table as losing outcomes; and*

*(ii) designating each of said first outcomes of the second payout table as losing outcomes and designating each of said second outcomes of the second payout table as winning outcomes;*

*(c) in response to a wager placed by the player on the first game instance, generating an outcome for the first game instance;*

*(d) providing to the player any payout associated with the generated outcome for the first game instance in accordance with the first payout table; and*

*(e) upon an occurrence of a triggering event:*

*(i) selecting the second payout table from the plurality of different payout tables to employ for the second game instance;*

*(ii) in response to a wager placed by the player on the second game instance, generating an outcome for the second game instance; and*

*(iii) providing to the player any payout associated with the generated outcome for the second game instance in accordance with the second payout table.*

*21. The method of claim 20, wherein said triggering event occurs based on a player input indicating a player preference for a different one of the plurality of payout tables.*

*22. The method of claim 20, wherein the triggering event occurs automatically in response to a payout above a predetermined threshold being provided.*

*23. The method of claim 20, wherein the triggering event occurs automatically in response to a plurality of payouts above a predetermined threshold being provided.*

*24. The method of claim 21, further comprising prompting the player for the player input.*

*25. A gaming device comprising:*

*at least one input device;*

*at least one display device;*

*at least one processor; and*

*at least one memory device which stores a plurality of instructions, which when executed by the at least one processor, cause the at least one processor to operate with the at least one display device and the at least one input device to:*

*(a) provide a plurality of different payout tables including a first payout table and a second payout table, said first payout table including a plurality of first outcomes and a plurality of second outcomes, and said second payout table including the plurality of first outcomes and the plurality of second outcomes;*

*(b) prior to any wager being placed by a player on a first play of a game and a second play of the game:*

*(i) designate each of said first outcomes of the first payout table as winning outcomes and designate each of said second outcomes of the first payout table as losing outcomes; and*

*(ii) designate each of said first outcomes of the second payout table as losing outcomes and designate each of said second outcomes of the second payout table as winning outcomes;*

*(c) in response to a wager placed by the player on the first play of the game, generate an outcome for the first play of the game;*

*(d) provide to the player any payout associated with the generated outcome for the first play of the game in accordance with the first payout table; and*

*(e) upon an occurrence of a triggering event:*

*(i) select the second payout table from the plurality of different payout tables to employ for the second play of the game;*

*(ii) in response to a wager placed by the player on the second play of the game, generate an outcome for the second play of the game using the selected second payout table; and*

*(iii) provide to the player any payout associated with the generated outcome for the second play of the game in accordance with the second payout table.*

*26. The gaming device of claim 25, wherein the at least one processor is positioned remotely from the at least display device.*

*27. The gaming device of claim 26, wherein when executed by the at least one processor, the plurality of instructions cause the at least one processor to store a credit balance.*

*28. The gaming device of claim 26, wherein when executed by the at least one processor, the plurality of instructions cause the at least one processor to determine a payout amount based on one of the payout tables.*

*29. The gaming device of claim 26, wherein the at least one memory device comprises a first memory for storing the first payout table and a second memory for storing the second payout table.*

*30. The gaming device of claim 27, wherein when executed by the at least one processor, the plurality of instructions cause the at least one processor to update the credit balance.*

*31. The gaming device of claim 27, wherein when executed by the at least one processor, the plurality of instructions cause the at least one processor to access the credit balance based on information from a player tracking card.*

*32. The gaming device of claim 27, wherein the credit balance comprises a source of points for the player to wager.*

*33. The gaming device of claim 27, wherein when executed by the at least one processor, the plurality of instructions cause the at least one processor to access the credit balance based on information from a credit card.*

*34. The gaming device of claim 30, wherein when executed by the at least one processor, the plurality of instructions cause the at least one processor to update the credit balance after a determination of an outcome for each play of said game.*

*35. The gaming device of claim 34, wherein when executed by the at least one processor, the plurality of instructions cause the at least one processor to update the credit balance after receiving funds deposited by the player.*

*36. A non-transitory computer readable medium comprising software with instructions, which when executed by a processor, cause the processor to:*

*(a) provide a game associated with a plurality of different payout tables, including a first payout table and a second payout table, said first payout table including a plurality of first outcomes and a plurality of second outcomes, and said second payout table including the plurality of first outcomes and the plurality of second outcomes;*

*(b) prior to any wager being placed by a player on a first play of the game and a second play of the game:*

*(i) designate each of said first outcomes of the first payout table as winning outcomes and designate each of said second outcomes of the first payout table as losing outcomes; and*

*(ii) designate each of said first outcomes of the second payout table as losing outcomes and designate each of said second outcomes of the second payout table as winning outcomes;*

*(c) in response to a wager by the player on the first play of the game, generate an outcome for the first play of the game;*

*(d) provide to the player any payout associated with the generated outcome for the first play of the game in accordance with the first payout table; and*

*(e) upon an occurrence of a triggering event:*

*(i) select the second payout table from the plurality of different payout tables to employ for the second play of the game;*

*(ii) in response to a wager placed by the player on the second play of the game, generate an outcome for the second play of the game; and*

*(iii) provide to the player any payout associated with the generated outcome for the second play of the game in accordance with the second payout table.*

*37. A gaming system comprising:*

*a user interface; and*

*a control system operatively coupled to the user interface and adapted to:*

*(a) provide a plurality of different payout tables including a first payout table and a second payout table, said first payout table including a first outcome and said second payout table including said first outcome;*

*(b) prior to accepting any wager placed by a player for a play of a game:*

*(i) designate the first outcome of said first payout table as a winning outcome; and*

*(ii) designate the first outcome of said second payout table as a losing outcome;*

*(c) accept a wager placed by the player for the play of the game through the user interface; and*

*(d) select one of said payout tables from the plurality of different payout tables to employ for the play of the game based on an input from the player which is distinct from the placement of the wager.*

*38. The gaming system of claim 37, wherein the user interface comprises a mode selection mechanism and the input from the player being distinct from the wager comprises manipulation of the mode selection mechanism.*

*39. The gaming system of claim 37, wherein the user interface comprises a slot machine user interface.*

*40. The gaming system of claim 37, wherein the user interface comprises a video slot machine user interface.*

*41. The gaming system of claim 37, wherein the control system comprises a local control system.*

*42. The gaming system of claim 37, wherein the control system comprises a remote server.*

*43. The gaming system of claim 37, wherein the control system is further adapted to determine a payout amount based on one of the payout tables.*

*44. The gaming system of claim 37, wherein the control system further comprises a first memory for storing the first payout table and a second memory for storing the second payout table.*

*45. The gaming system of claim 37, wherein prior to accepting any wager placed by the player for the play of the game, the second payout table includes a second outcome that is a designated winning outcome, and the first payout table includes the second outcome, the second outcome of the first payout table being a designated losing outcome.*

*46. The gaming system of claim 37, wherein the second payout table has a greater statistical likelihood of returning a winning outcome than a losing outcome.*

*47. The gaming system of claim 38, wherein the mode selection mechanism comprises at least one of a button and a toggle switch.*

*48. The gaming system of claim 38, wherein the control system is further adapted to set a software flag on detection of the manipulation of the mode selection mechanism.*

*49. A gaming system comprising:*

*a user interface; and*

*a control system comprising a remote server, said control system operatively coupled to the user interface and adapted to:*

*(a) provide a plurality of different payout tables including a first payout table and a second payout table, said first payout table including a first outcome and said second payout table including said first outcome;*

*(b) prior to accepting any wager placed by a player for a play of a game:*

*(i) designate the first outcome of the first payout table as a winning outcome; and*

*(ii) designate the first outcome of the second payout table as a losing outcome;*

*(c) accept a wager placed by the player for the play of the game through the user interface;*

(*d*) *select one of the payout tables from the plurality of different payout tables to employ for the play of the game based on an input from the player which is distinct from the placement of the wager; and*

(*e*) *store a credit balance.*

*50. The gaming system of claim 49, wherein the control system is further adapted to access the credit balance based on information from a player tracking card.*

*51. The gaming system of claim 49, wherein the credit balance comprises a source of points for the player to wager.*

*52. The gaming system of claim 49, wherein the control system is further adapted to access the credit balance based on information from a credit card.*

*53. The gaming system of claim 49, wherein the control system is further adapted to update the credit balance.*

*54. The gaming system of claim 53, wherein the control system is adapted to update the credit balance after a determination of an outcome for the game.*

*55. The gaming system of claim 53, wherein the control system is adapted to update the credit balance after receiving funds deposited by the player.*

*56. A method of operating a gaming system, said method comprising:*

(*a*) *providing a plurality of different payout tables including a first payout table and a second payout table, said first payout table including a first outcome and said second payout table including said first outcome;*

(*b*) *prior to accepting any wager placed by a player for a play of a game at a gaming device of the gaming system:*

(*i*) *designating the first outcome of the first payout table as a winning outcome; and*

(*ii*) *designating the first outcome of the second payout table as a losing outcome;*

(*c*) *accepting a wager placed by the player for the play of the game at the gaming device; and*

(*d*) *selecting one of the payout tables from the plurality of different payout tables to employ for the play of the game based on an input distinct from the placement of the wager.*

*57. The method of claim 56, wherein prior to accepting any wager placed by the player for the play of the game, the second payout table includes a second outcome that is a designated winning outcome, and the first payout table also includes the second outcome, the second outcome of the first payout table being a designated losing outcome.*

*58. A non-transitory computer readable medium comprising software with instructions, which when executed by a processor, cause the processor to:*

(*a*) *provide a game associated with a plurality of different payout tables, including a first payout table and a second payout table, said first payout table including a first outcome and said second payout table including said first outcome;*

(*b*) *prior to accepting any wager placed by a player for a play of the game:*

(*i*) *designate the first outcome of the first payout table as a winning outcome; and*

(*ii*) *designate the first outcome of the second payout table as a losing outcome;*

(*c*) *accept a wager placed by the player for the play of the game; and*

(*d*) *select one of the payout tables from the plurality of different payout tables to employ for the play of the game based on an input distinct from the placement of the wager.*

*59. The non-transitory computer readable medium of claim 58, wherein prior to accepting any wager placed by the player for the play of the game the second payout table includes a second outcome that is a designated winning outcome, and the first payout table also includes the second outcome, the second outcome of the first payout table being a designated losing outcome.*

*60. A method of operating a gaming system, said method comprising:*

(*a*) *providing a plurality of different payout tables including a first payout table and a second payout table;*

(*b*) *prior to any wager being placed by a player for a first play of a game and a second play of the game at a gaming device of the gaming system:*

(*i*) *said first payout table includes a plurality of designated first payout table winning outcomes and a plurality of designated first payout table losing outcomes; and*

(*ii*) *said second payout table includes a plurality of designated second payout table winning outcomes which correspond to the plurality of designated first payout table losing outcomes and a plurality of designated second payout table losing outcomes which correspond to the plurality of designated first payout table winning outcomes;*

(*c*) *in response to a wager being placed by the player for the first play of the game at the gaming device, generating an outcome for said first play of the game;*

(*d*) *providing to the player any payout associated with the generated outcome for the first play of the game in accordance with the first payout table; and*

(*e*) *upon an occurrence of a triggering event:*

(*i*) *selecting the second payout table from the plurality of different payout tables to employ for the second play of the game;*

(*ii*) *in response to a wager by the player for the second play of the game, generating an outcome for said second play of the game; and*

(*iii*) *providing to the player any payout associated with the generated outcome for the second play of the game in accordance with the second payout table.*

* * * * *

UNITED STATES PATENT AND TRADEMARK OFFICE

CERTIFICATE OF CORRECTION

PATENT NO. : RE43,037 E
APPLICATION NO. : 11/542040
DATED : December 20, 2011
INVENTOR(S) : Walker et al.

It is certified that error appears in the above-identified patent and that said Letters Patent is hereby corrected as shown below:

IN THE CLAIMS:

Column 22, line 59, before “display” add --one--.

Column 24, line 19, replace “being” with --which is--.

Signed and Sealed this
Third Day of April, 2012

David J. Kappos

David J. Kappos
*Director of the United States Patent and Trademark Office*